United States Patent
Foutch (12)

(10) Patent No.: US 11,143,170 B2
(45) Date of Patent: Oct. 12, 2021

(54) SHAPE MEMORY ALLOY LIFTING TUBES AND SHAPE MEMORY ALLOY ACTUATORS INCLUDING THE SAME

(71) Applicant: The Boeing Company, Chicago, IL (US)

(72) Inventor: David W. Foutch, Seattle, WA (US)

(73) Assignee: The Boeing Company, Chicago, IL (US)

(*) Notice: Subject to any disclaimer, the term of this patent is extended or adjusted under 35 U.S.C. 154(b) by 133 days.

(21) Appl. No.: 16/457,801

(22) Filed: Jun. 28, 2019

(65) Prior Publication Data
US 2020/0408197 A1 Dec. 31, 2020

(51) Int. Cl.
*F03G 7/06* (2006.01)
*F02C 9/16* (2006.01)
*F02C 7/24* (2006.01)

(52) U.S. Cl.
CPC .............. *F03G 7/065* (2013.01); *F02C 7/24* (2013.01); *F02C 9/16* (2013.01); *F05D 2220/32* (2013.01); *F05D 2270/303* (2013.01); *F05D 2300/505* (2013.01)

(58) Field of Classification Search
CPC ...................................................... F03G 7/065
See application file for complete search history.

(56) References Cited

U.S. PATENT DOCUMENTS

| 1,768,222 A | 6/1930 | Uhde |
| 2,886,121 A | 5/1959 | Welbourn |
| 2,988,302 A | 6/1961 | Smith |
| 3,205,939 A | 9/1965 | Huet |

(Continued)

FOREIGN PATENT DOCUMENTS

| CA | 2910896 | 7/2016 |
| EP | 1130257 | 9/2001 |

(Continued)

OTHER PUBLICATIONS

European Patent Office, Partial European Search Report for related European Patent Application No. 20176784, dated Oct. 27, 2020.

(Continued)

*Primary Examiner* — Laert Dounis
(74) *Attorney, Agent, or Firm* — Dascenzo Gates Intellectual Property Law, P.C.

(57) ABSTRACT

A shape memory alloy (SMA) actuator includes an SMA lifting tube that extends between a first end and a second end and that is configured to be in thermal communication with a process fluid during operative use of the SMA actuator. The SMA actuator is configured to assume a conformation among a plurality of conformations defined between and including a first conformation and a second conformation based, at least in part, on the temperature of the process fluid that is in thermal communication with the SMA lifting tube. The SMA lifting tube is configured such that the second end translates relative to the first end at least partially along a lateral direction that is at least substantially perpendicular to at least a portion of the SMA lifting tube between the first end and the second end as the SMA actuator transitions between the first conformation and the second conformation.

27 Claims, 15 Drawing Sheets

(56) References Cited

U.S. PATENT DOCUMENTS

| | | |
|---|---|---|
| 3,229,762 A | 1/1966 | Vollhardt |
| 4,060,127 A | 11/1977 | Savin et al. |
| 4,151,710 A | 5/1979 | Griffin et al. |
| 4,203,392 A | 5/1980 | McLane |
| 4,266,602 A | 5/1981 | White et al. |
| 4,298,090 A | 11/1981 | Chapman |
| 4,700,541 A | 10/1987 | Gabriel et al. |
| 4,790,624 A * | 12/1988 | Van Hoye ............... B25J 18/06 |
| | | 385/118 |
| 5,127,228 A | 7/1992 | Swenson |
| 5,150,864 A | 9/1992 | Roglin et al. |
| 5,544,703 A | 8/1996 | Joël et al. |
| 5,975,468 A | 11/1999 | Moignier et al. |
| 6,065,934 A | 5/2000 | Jacot et al. |
| 6,499,952 B1 | 12/2002 | Jacot et al. |
| 6,832,477 B2 | 12/2004 | Gummin et al. |
| 7,037,076 B2 | 5/2006 | Jacot et al. |
| 7,299,630 B2 | 11/2007 | Browne et al. |
| 7,464,548 B2 | 12/2008 | Yson et al. |
| 7,723,896 B2 | 5/2010 | Esashi et al. |
| 7,771,392 B2 | 8/2010 | De Polo et al. |
| 7,788,921 B2 | 9/2010 | Takahashi |
| 7,810,326 B2 | 10/2010 | Taya et al. |
| 7,852,580 B2 | 12/2010 | Yang |
| 7,878,459 B2 | 2/2011 | Mabe et al. |
| 8,104,278 B2 | 1/2012 | Browne et al. |
| 8,118,264 B2 | 2/2012 | Mabe et al. |
| 8,446,065 B2 | 5/2013 | Browne et al. |
| 8,449,273 B2 | 5/2013 | Ikushima et al. |
| 8,499,913 B2 | 8/2013 | Gunter |
| 8,678,299 B2 | 3/2014 | Ham et al. |
| 8,769,946 B2 | 7/2014 | Alexander et al. |
| 8,820,477 B1 | 9/2014 | Herrera et al. |
| 8,876,046 B2 | 11/2014 | Gunter et al. |
| 9,046,082 B2 | 6/2015 | Jee |
| 9,581,146 B2 | 2/2017 | Shome et al. |
| 9,638,176 B2 | 5/2017 | Shivashankara et al. |
| 9,759,203 B2 | 9/2017 | Brown |
| 9,897,078 B2 | 2/2018 | Nicholson et al. |
| 9,903,274 B2 | 2/2018 | Diaz et al. |
| 9,989,040 B2 | 6/2018 | Hallila et al. |
| 10,436,118 B2 | 10/2019 | Weaver et al. |
| 11,008,943 B2 | 5/2021 | Tajiri et al. |
| 2004/0261411 A1 | 12/2004 | MacGregor |
| 2005/0187612 A1 * | 8/2005 | Edwin ..................... A61F 2/82 |
| | | 623/1.19 |
| 2007/0034447 A1 | 2/2007 | Proscia et al. |
| 2010/0263964 A1 | 10/2010 | Kosaka et al. |
| 2011/0185731 A1 | 8/2011 | Mylemans |
| 2012/0168115 A1 | 7/2012 | Raimarckers et al. |
| 2013/0020061 A1 | 1/2013 | Bergh |
| 2013/0046285 A1 | 2/2013 | Griffin et al. |
| 2013/0055718 A1 | 3/2013 | Bodard et al. |
| 2013/0251510 A1 | 9/2013 | Runyan et al. |
| 2014/0086772 A1 | 3/2014 | Olsen |
| 2014/0209408 A1 | 7/2014 | Morvant |
| 2015/0086934 A1 | 3/2015 | Akbarimonfared et al. |
| 2015/0233580 A1 | 8/2015 | Olesen et al. |
| 2015/0315972 A1 | 11/2015 | Lumbab et al. |
| 2016/0040942 A1 | 2/2016 | Dziubinschi et al. |
| 2017/0089238 A1 | 3/2017 | Leyko et al. |
| 2017/0234144 A1 | 8/2017 | Mugglestone |
| 2017/0248372 A1 | 8/2017 | Erno et al. |
| 2017/0276440 A1 | 9/2017 | Kenworthy et al. |
| 2017/0301334 A1 | 10/2017 | Nampy |
| 2017/0321603 A1 | 11/2017 | Zebian |
| 2018/0231027 A1 | 8/2018 | Pastouchenko et al. |
| 2019/0112066 A1 | 4/2019 | Alonso-Miralles |

FOREIGN PATENT DOCUMENTS

| | | | |
|---|---|---|---|
| EP | 2472067 | 7/2012 | |
| EP | 2484586 | 8/2012 | |
| EP | 2775244 | 9/2014 | |
| EP | 2894323 | 7/2015 | |
| EP | 3023724 | 5/2016 | |
| EP | 3121429 | 1/2017 | |
| EP | 3483413 | 5/2019 | |
| FR | 2549585 | 1/1985 | |
| FR | 2862353 | 5/2005 | |
| GB | 588520 | 5/1947 | |
| GB | 2106190 A * | 4/1983 | ............ F03G 7/065 |
| GB | 2476855 | 7/2011 | |
| JP | 60026181 A * | 2/1985 | ............ F03G 7/065 |
| JP | 06249129 | 9/1994 | |
| JP | 07167036 A * | 7/1995 | |
| JP | 10176651 A * | 6/1998 | |
| KR | 20130103692 A * | 9/2013 | |
| WO | WO 01/16484 | 3/2001 | |
| WO | WO 2011/115883 | 9/2011 | |
| WO | WO 2014/068326 | 5/2014 | |
| WO | WO 2014/151685 | 9/2014 | |
| WO | WO 2017/052798 | 3/2017 | |
| WO | WO 2017/117088 | 7/2017 | |

OTHER PUBLICATIONS

Machine-generated English language translation of the abstract of EP 2472067, downloaded from Espacenet.com on Jan. 27, 2021.
Operation, Installation & Maintenance Manual for W.E. Anderson Series 38R Self-Operating Temperature Regulators, Bulletin V-10, Dwyer Instruments Inc., undated.
Technical Information for Temperature Regulators, Part 2: Self-operated Regulators, Samson AG 99/12, 1999.
Machine-generated English translation of the abstract of FR 2862353.
Machine-generated English translation of the abstract of JP 06249129.
Machine-generated English translation of the abstract of FR 2549585.
U.S. Appl. No. 15/901,779, filed Feb. 21, 2018, Foutch et al.
European Patent Office, Extended European Search Report for related European Patent Application No. 20176784, dated Jan. 26, 2021.

* cited by examiner

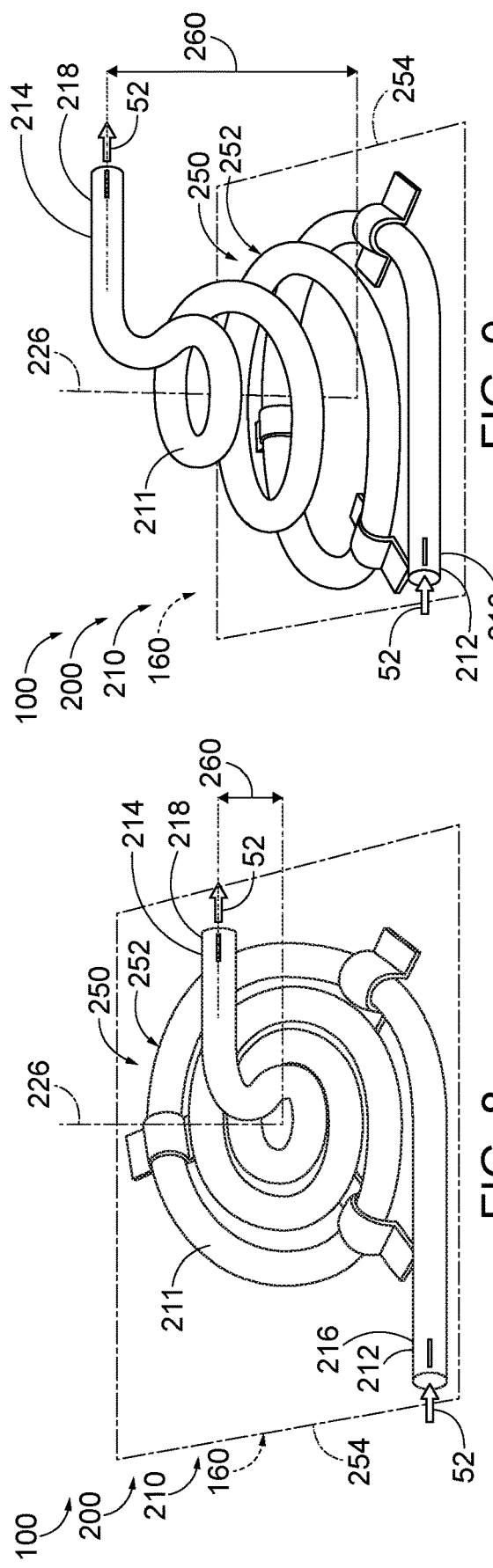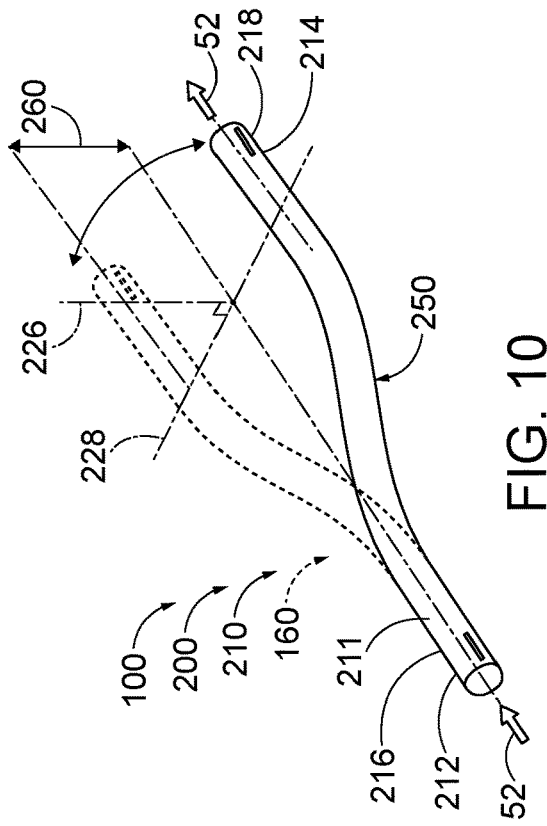
FIG. 8
FIG. 9
FIG. 10

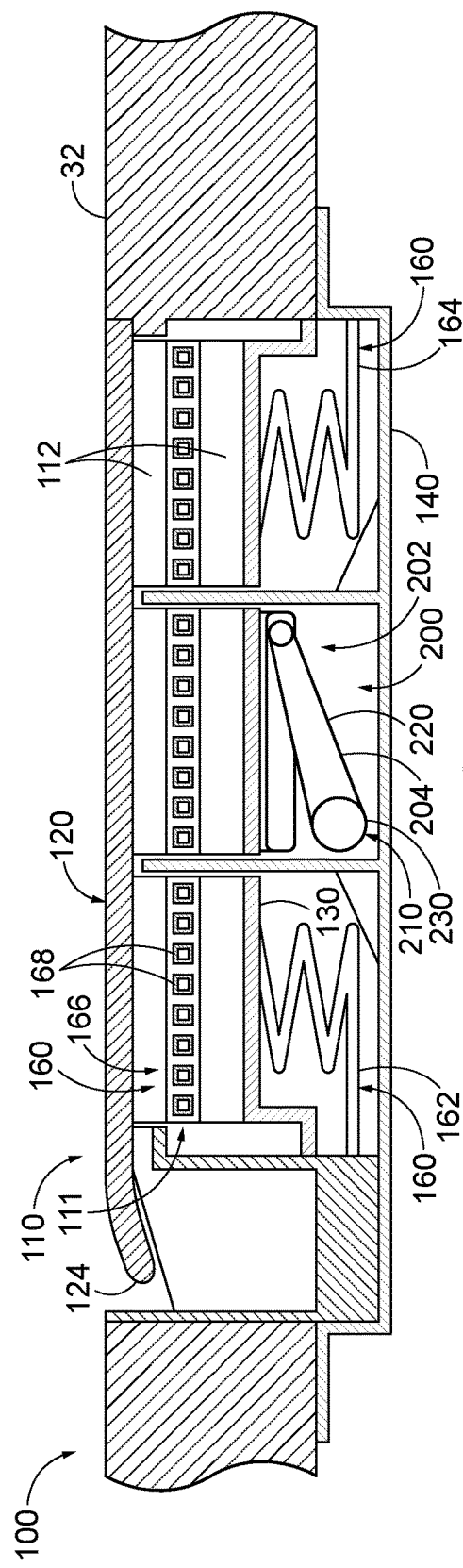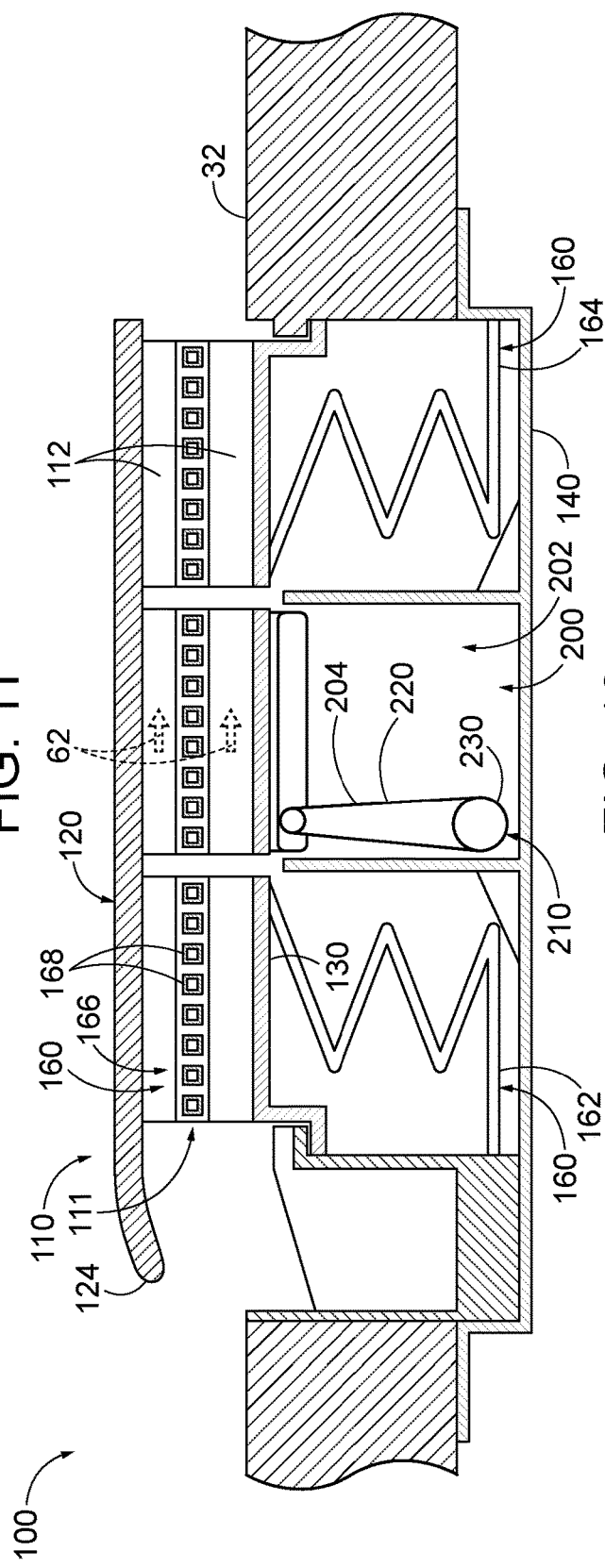

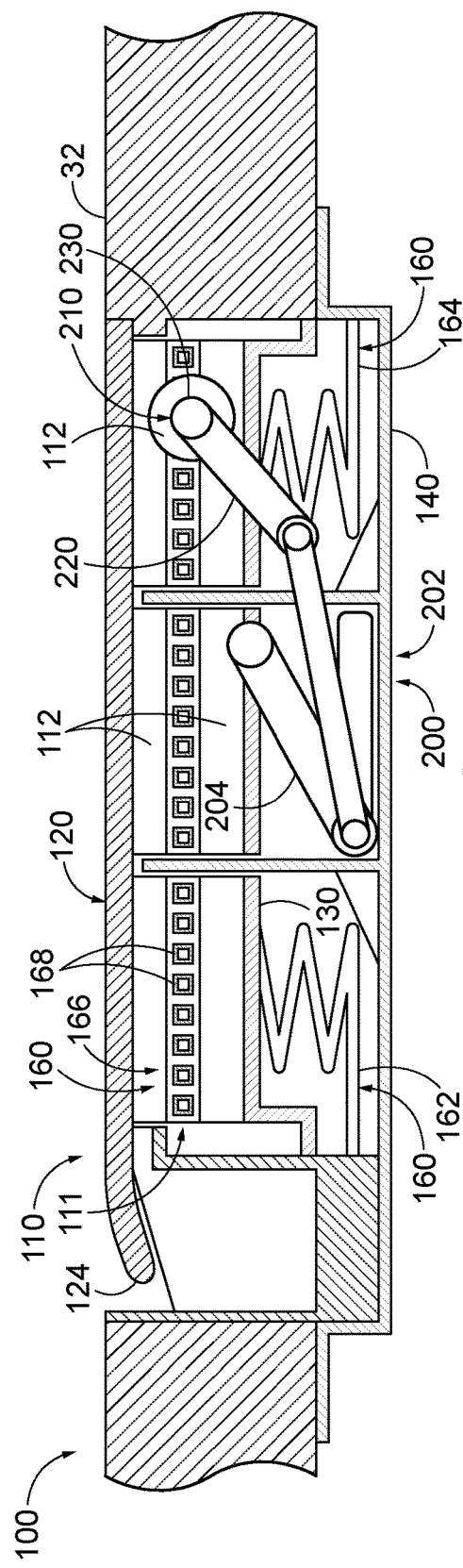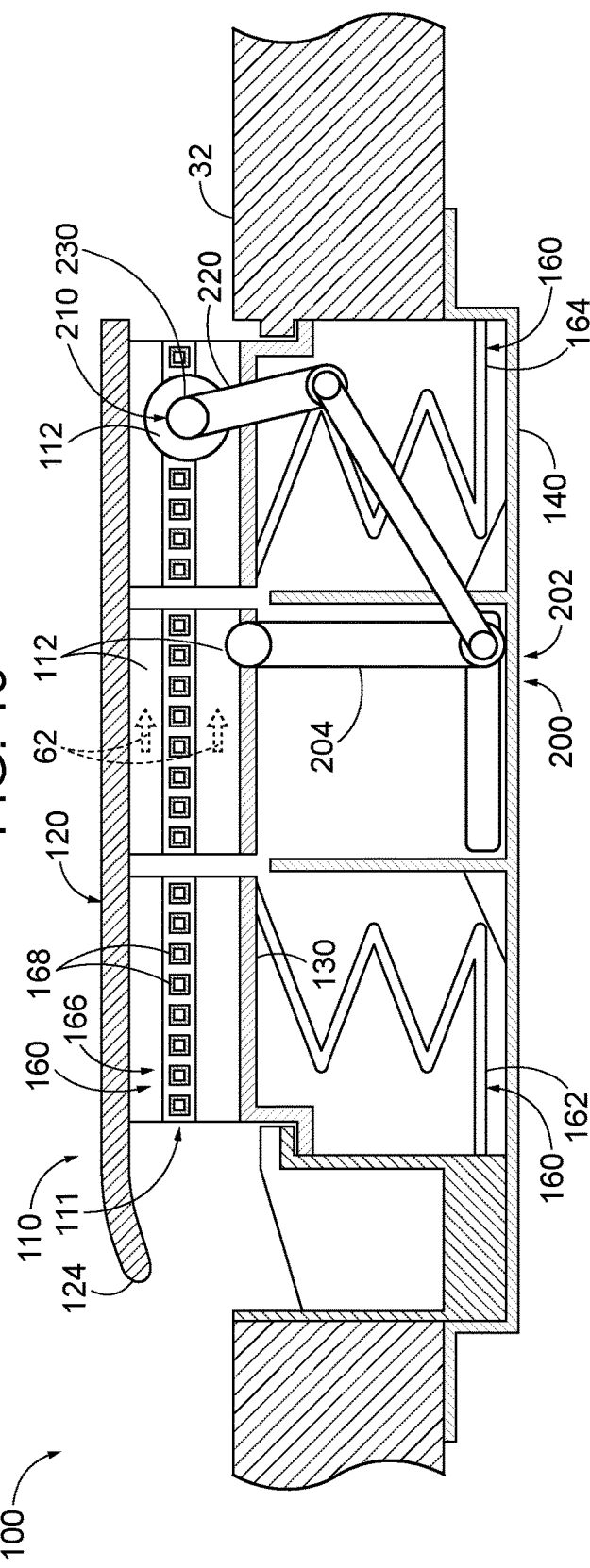

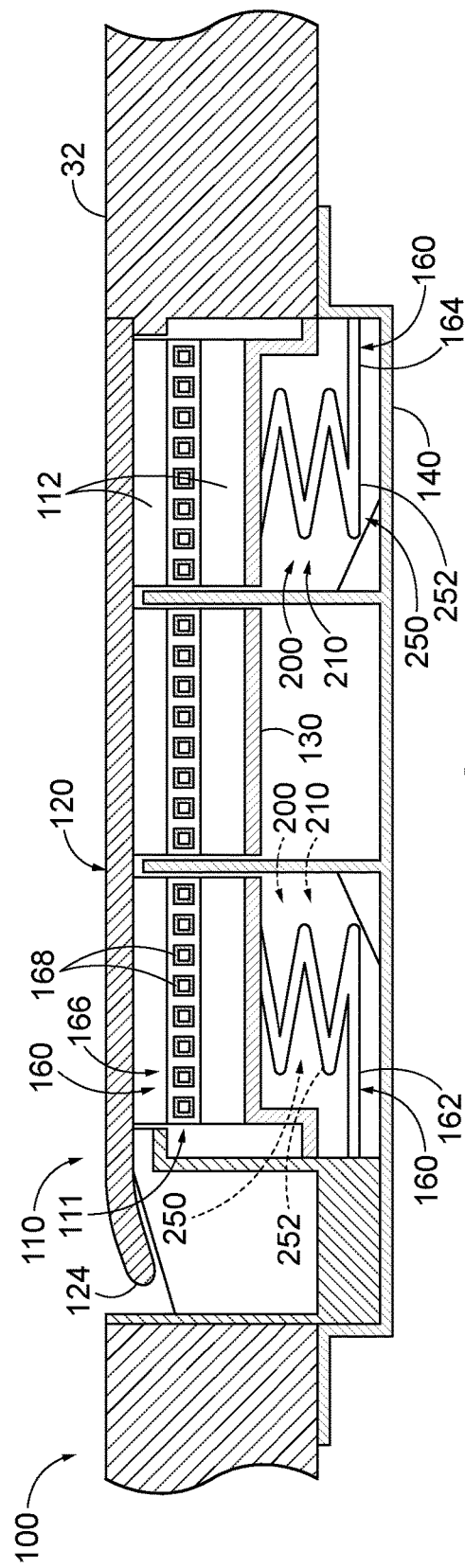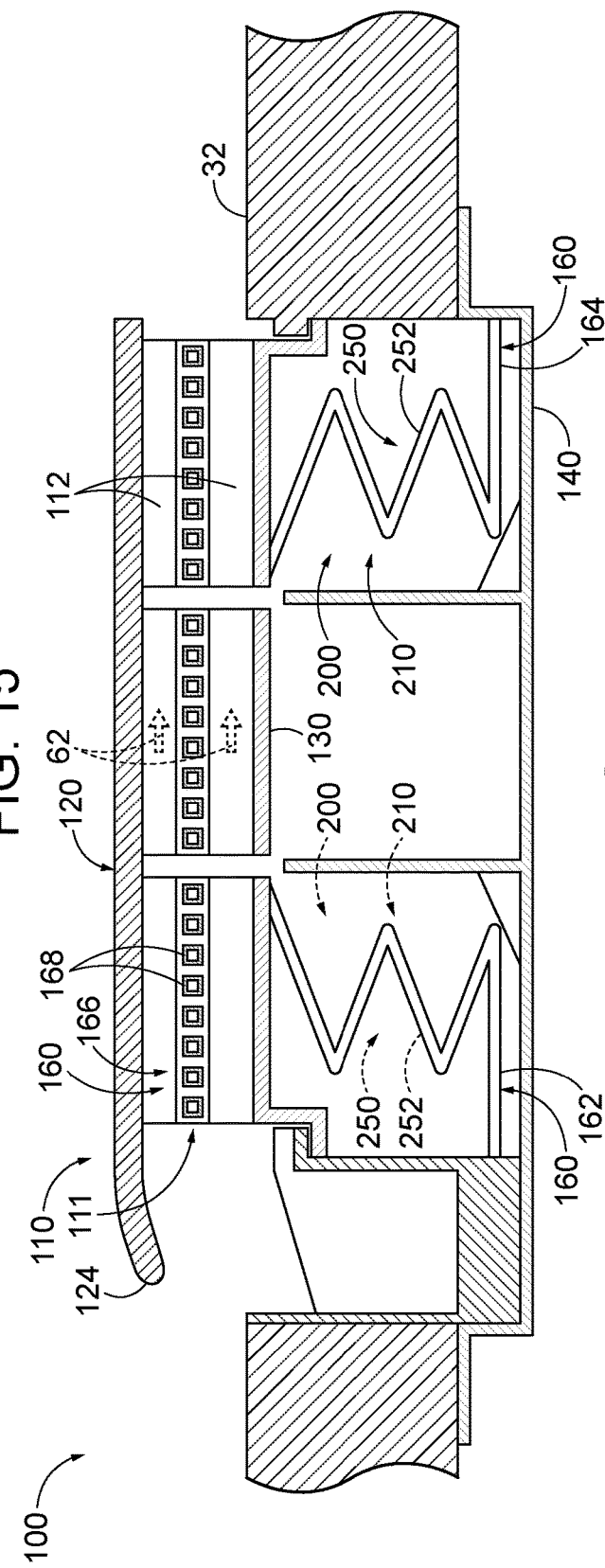
FIG. 15
FIG. 16

SHAPE MEMORY ALLOY LIFTING TUBES AND SHAPE MEMORY ALLOY ACTUATORS INCLUDING THE SAME

FIELD

The present disclosure relates to shape memory alloy actuators with shape memory alloy lifting tubes.

BACKGROUND

Thermal management systems generally may be configured to regulate the temperature of a process fluid, such as an engine oil, via thermal exchange between the process fluid and a thermal management fluid, such as air. For example, a thermal management system installed in a turbofan engine of an aircraft may utilize a flow air flow produced by the turbofan engine to decrease a temperature of a hot oil flowing through a conduit. However, incorporation of such thermal management systems into turbofan engines may introduce undesirable aerodynamic drag forces when the conduit is introduced into the air flow, and/or may disrupt acoustic noise attenuation properties of the turbofan engine.

SUMMARY

Shape memory alloy (SMA) actuators are disclosed herein. An SMA actuator includes an SMA lifting tube that extends between a first end and a second end and that is configured to be in thermal communication with a process fluid during operative use of the SMA actuator. The SMA actuator is configured to assume a conformation among a plurality of conformations defined between and including a first conformation and a second conformation based, at least in part, on the temperature of the process fluid that is in thermal communication with the SMA lifting tube. The SMA lifting tube is configured such that the second end translates relative to the first end at least partially along a lateral direction that is at least substantially perpendicular to at least a portion of the SMA lifting tube between the first end and the second end as the SMA actuator transitions between the first conformation and the second conformation.

BRIEF DESCRIPTION OF THE DRAWINGS

FIG. 8 is a top side perspective view illustrating an example of an SMA actuator that includes an SMA lifting tube in the form of an SMA coil in a first conformation, according to the present disclosure.

FIG. 9 is a top side perspective view illustrating the SMA actuator of FIG. 8 with the SMA coil in a second conformation, according to the present disclosure.

FIG. 10 is a top side perspective view illustrating an example of an SMA actuator that includes an SMA lifting tube, according to the present disclosure.

FIG. 11 is a cross-sectional fragmentary side elevation view illustrating an example of a thermal management system with a heat exchanger in a stowed position, according to the present disclosure.

FIG. 12 is a cross-sectional fragmentary side elevation view illustrating the thermal management system of FIG. 11 with the heat exchanger in a deployed position, according to the present disclosure.

FIG. 13 is a cross-sectional fragmentary side elevation view illustrating an example of a thermal management system with a heat exchanger in a stowed position, according to the present disclosure.

FIG. 14 is a cross-sectional fragmentary side elevation view illustrating the thermal management system of FIG. 13 with the heat exchanger in a deployed position, according to the present disclosure.

FIG. 15 is a cross-sectional fragmentary side elevation view illustrating an example of a thermal management system with a heat exchanger in a stowed position, according to the present disclosure.

FIG. 16 is a cross-sectional fragmentary side elevation view illustrating the thermal management system of FIG. 15 with the heat exchanger in a deployed position, according to the present disclosure.

DESCRIPTION

Figure 1:
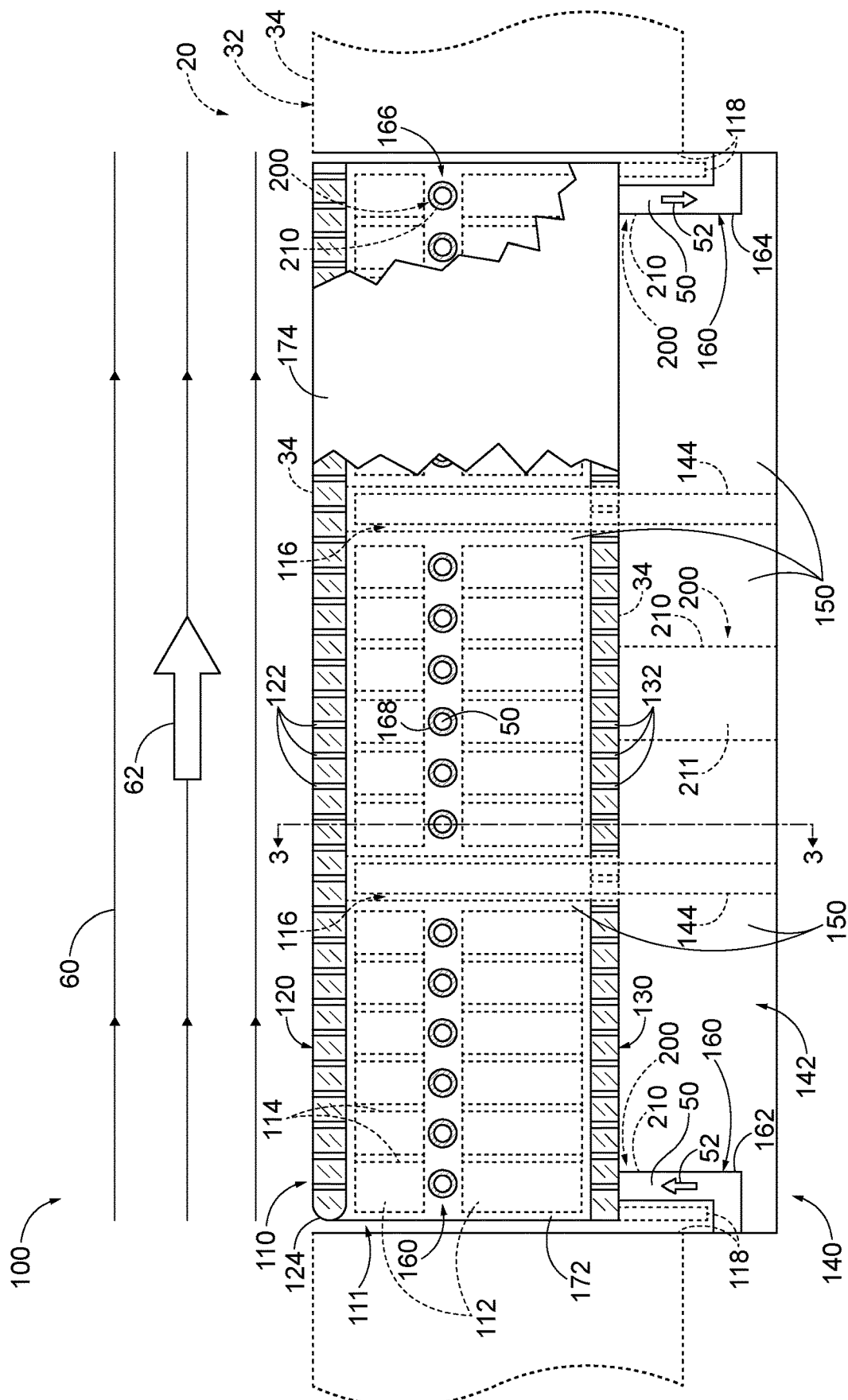
FIG. 1 is a cross-sectional fragmentary schematic side elevation view illustrating examples of thermal management systems with a heat exchanger in a stowed position, according to the present disclosure.

FIGS. 1-20 provide illustrative, non-exclusive examples of shape memory alloy (SMA) actuators 210, of thermal management systems 100 including SMA actuators 210, of turbofan engines 20 including thermal management systems 100 and/or SMA actuators 210, of aircraft 10 including turbofan engines 20, and/or of methods 300 of utilizing thermal management systems 100, according to the present disclosure. Elements that serve a similar, or at least substantially similar, purpose are labeled with like numbers in each of FIGS. 1-20, and these elements may not be discussed in detail herein with reference to each of FIGS. 1-20. Similarly, all elements may not be labeled in each of FIGS. 1-20, but reference numerals associated therewith may be utilized herein for consistency. Elements, components, and/or features that are discussed herein with reference to one or more of FIGS. 1-20 may be included in and/or utilized with any of FIGS. 1-20 without departing from the scope of the present disclosure. Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

Figure 2:
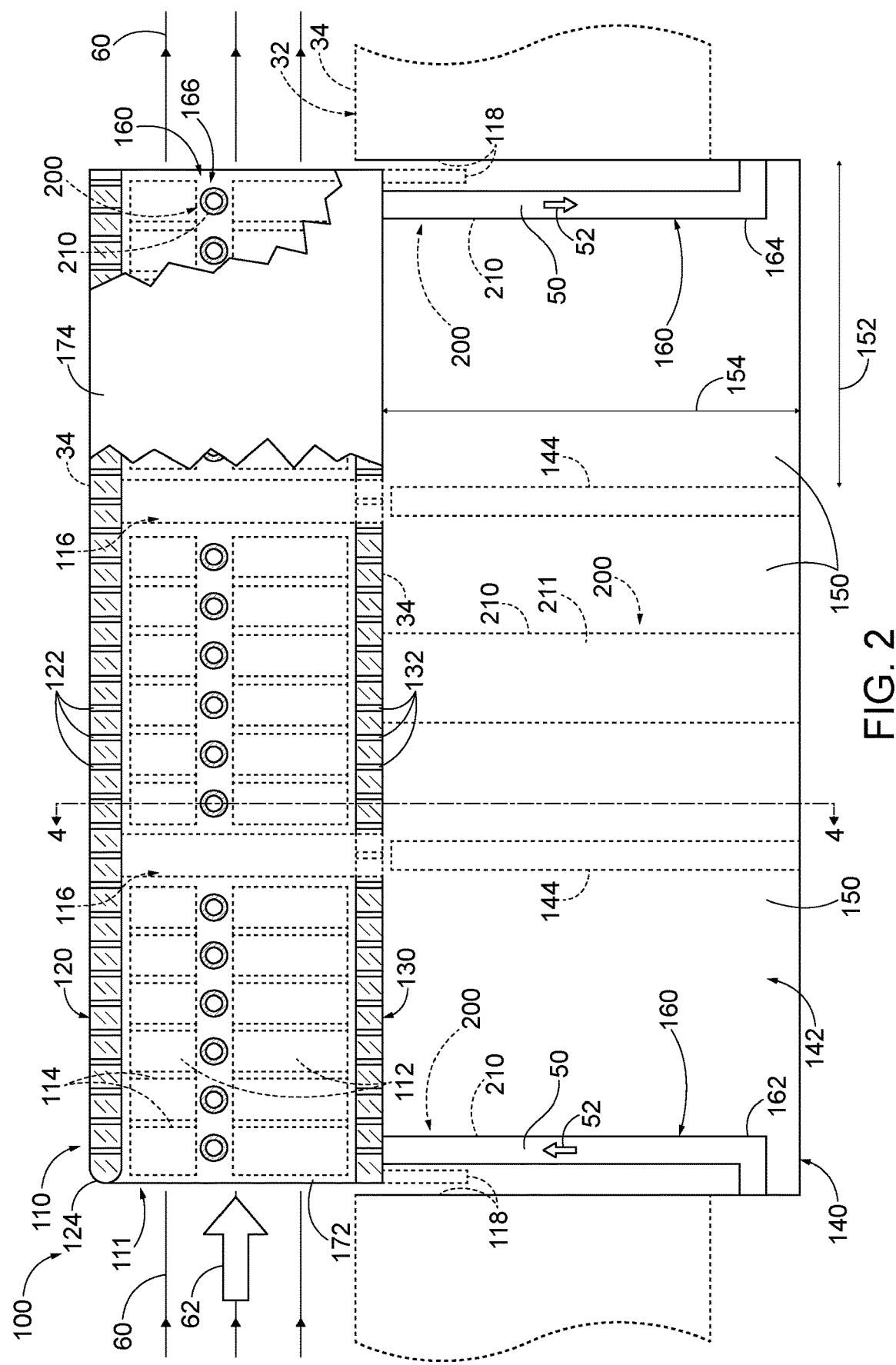
FIG. 2 is a cross-sectional fragmentary schematic side elevation view illustrating examples of thermal management systems with a heat exchanger in a deployed position, according to the present disclosure.

FIGS. 1-2 schematically illustrate examples of thermal management systems 100 according to the present disclosure. Thermal management systems 100 according to the present disclosure are configured to regulate a temperature of a process fluid 50 via thermal exchange between process fluid 50 and a thermal management fluid 60 during operative use of thermal management system 100. That is, the present disclosure is directed to systems and structures that are configured to be utilized in conjunction with process fluids 50 and thermal management fluids 60 during operative use thereof. Accordingly, discussions and references herein to process fluid 50 and/or to thermal management fluid 60 are to be understood as describing examples in which thermal management system 100 is in operative use in conjunction with process fluid 50 and thermal management fluid 60. Equivalently, thermal management system 100 may be described as being in operative use when utilizing and/or operating relative to process fluid 50 and/or thermal management fluid 60 in any appropriate manner as described herein. However, the systems and apparatuses disclosed herein do not require that process fluid 50 and/or thermal management fluid 60 always be present, and the present disclosure should be understood as describing such systems and apparatuses even in the absence of process fluid 50 and/or thermal management fluid 60.

As described herein, thermal management systems 100 according to the present disclosure generally are configured to regulate the temperature of process fluid 50 by introducing process fluid 50 into heat exchange relation with thermal management fluid 60 depending upon the temperature of process fluid 50. In some examples, and as described herein, thermal management system 100 is configured to automatically introduce process fluid 50 into heat exchange relation with thermal management fluid 60 based upon the temperature of process fluid 50, such as without active control and/or user input. In this manner, such examples of thermal management systems 100 are configured to maintain the temperature of process fluid 50 within a predetermined temperature range by automatically heating or cooling process fluid 50 with thermal management fluid 60 only when the temperature of process fluid 50 departs from the predetermined temperature range. However, it is also within the scope of the present disclosure that thermal management system 100 may introduce process fluid 50 into heat exchange relation with thermal management fluid 60 via manual and/or active control. Moreover, and as discussed in more detail below, utilizing thermal management systems 100 according to the present disclosure in aeronautical applications additionally may have the benefit of minimizing an aerodynamic drag produced by the thermal management system when process fluid 50 is removed from thermal management fluid 60 and/or of attenuating an acoustic noise associated with thermal management fluid 60.

As schematically illustrated in FIGS. 1-2, thermal management system 100 includes a heat exchanger 110 that at least partially defines a heat transfer region 111 configured such that the thermal exchange between process fluid 50 and thermal management fluid 60 occurs within heat transfer region 111 during operative use of thermal management system 100. For example, and as schematically illustrated in FIGS. 1-2, heat exchanger 110 may include an external surface 120 and an internal surface 130 that extends at least substantially parallel to external surface 120, and heat transfer region 111 may extend between and/or be at least partially defined by external surface 120 and internal surface 130. In such examples, and as described herein, heat exchanger 110 is configured to permit sound waves to propagate through heat transfer region 111 from external surface 120 to internal surface 130 (or vice versa). As schematically illustrated in FIGS. 1-2, each of external surface 120 and internal surface 130 may be at least substantially planar. However, this is not required, and it is additionally within the scope of the present disclosure that external surface 120 and internal surface 130 each may have any appropriate shape or configuration, such as a curved and/or arcuate shape.

Thermal management system 100 additionally includes a housing 140 that selectively and operatively receives heat exchanger 110, as well as an actuator assembly 200 configured to selectively position heat exchanger 110 relative to housing 140. Specifically, actuator assembly 200 is configured to selectively assume a position among a plurality of positions that include a stowed position (schematically illustrated in FIG. 1), in which heat exchanger 110 is at least substantially received within housing 140, and a deployed position (schematically illustrated in FIG. 2), in which heat exchanger 110 extends from housing 140. Actuator assembly 200 also may be described as being in an intermediate position when actuator assembly 200 is in any of the plurality of positions defined between and excluding the stowed position and the deployed position. In this manner, heat exchanger 110 may be only partially received within housing 140 when actuator assembly 200 is in an intermediate position. Stated differently, heat exchanger 110 may extend only partially from housing 140 when actuator assembly 200 is in an intermediate position.

As used herein, thermal management system 100 and/or heat exchanger 110 also may be described as being in the stowed position when actuator assembly 200 is in the stowed position. Similarly, thermal management system 100 and/or heat exchanger 110 also may be described as being in the deployed position when actuator assembly 200 is in the deployed position.

As schematically illustrated in FIGS. 1-2, each of heat exchanger 110 and/or housing 140 may include one or more sliding guides 118 configured to at least partially maintain an alignment of heat exchanger 110 relative to housing 140 as heat exchanger 110 translates relative to housing 140, such as while actuator assembly 200 transitions between the stowed position and the deployed position. For example, each sliding guide 118 may include and/or be a low-friction surface. Additionally or alternatively, in an example in which heat exchanger 110 and housing 140 each include sliding guides 118, sliding guide 118 of heat exchanger 110 may include an interfacing surface that engages sliding guide 118 of housing 140, and/or vice-versa. That is, while FIGS. 1-2 schematically illustrate heat exchanger 110 (and sliding guide 118 thereof) as being spaced apart from housing 140 for clarity, heat exchanger 110 may be in sliding contact with housing 140 via sliding guide(s) 118.

With continued reference to FIGS. 1-2, thermal management system 100 further includes a process fluid conduit 160 configured to convey a process fluid flow 52 of process fluid 50 through heat transfer region 111. Specifically, process fluid conduit 160 includes a heat transfer portion 166 that extends within heat transfer region 111. Thermal management system 100 is configured such that, when actuator assembly 200 is in the deployed position (as schematically illustrated in FIG. 2), heat transfer region 111 extends within a thermal management fluid flow 62 of thermal management fluid 60 such that heat transfer portion 166 of process fluid conduit 160 is in thermal contact with each of process fluid flow 52 and thermal management fluid flow 62 and such that process fluid flow 52 flows in heat exchange relation with thermal management fluid flow 62. Stated differently, when heat exchanger 110 extends from housing 140 and into thermal management fluid flow 62, heat transfer region 111 and heat transfer portion 166 are exposed to thermal management fluid flow 62 such that thermal communication may take place between thermal management fluid 60 and process fluid 50. Alternatively, when actuator assembly 200 is in the stowed position, heat exchanger 110 is substantially removed from thermal management fluid flow 62, such that process fluid flow 50 is substantially thermally isolated from thermal management fluid 60. As used herein, thermal management system 100 and/or any component thereof may be described as being "in operative use" and/or as being "operatively utilized" when process fluid flow 52 exists within process fluid conduit and/or when thermal management fluid flow 62 exists within and/or adjacent to heat exchanger 110, regardless of whether actuator assembly 200 is in the stowed position, the deployed position, or any of the plurality of intermediate positions.

As used herein, process fluid flow 52 may refer to a flow characteristic of process fluid 50 and/or may refer to process fluid 50 itself. For example, a reference to a flow of process fluid 50 also may be referred to as process fluid flow 52 (and/or a characteristic thereof). Similarly, a characteristic of process fluid flow 52 also may be understood as describing process fluid 50. Additionally, process fluid flow 52 may be described as including and/or consisting of process fluid 50. Thus, for example, a description of process fluid 50 flowing through a conduit equivalently may be described as process fluid flow 52 flowing through the conduit. Analogously, as used herein, thermal management fluid flow 62 may refer to a flow characteristic of thermal management fluid 60 and/or may refer to thermal management fluid 60 itself. For example, a reference to a flow of thermal management fluid 60 also may be referred to as thermal management fluid flow 62 (and/or a characteristic thereof). Similarly, a characteristic of thermal management fluid flow 62 also may be understood as describing thermal management fluid 60. Thus, for example, a description of thermal management fluid 60 flowing through a region equivalently may be described as thermal management fluid flow 62 flowing through the region.

In some examples, thermal management system 100 is configured such that actuator assembly 200 automatically transitions between the stowed position and the deployed position, such as based upon a temperature of process fluid 50 within process fluid conduit 160. In such examples, and as described in more detail herein, actuator assembly 200 may include an SMA actuator 210 that automatically transitions heat transfer region 111 into and out of thermal management fluid flow 62 based upon the temperature of process fluid 50 that is in thermal contact with SMA actuator 210.

Thermal management system 100 additionally or alternatively may be configured to exhibit acoustic damping properties (e.g., acoustic noise attenuation properties) when actuator assembly 200 is in one or both of the stowed position and the deployed position and/or when actuator assembly 200 is in the intermediate position. For example, and as described in more detail herein, thermal management system 100 may be configured such that an acoustic noise propagating through thermal management fluid flow 62 is mitigated and/or attenuated by the presence of thermal management system 100 regardless of the position of actuator assembly 200. That is, the acoustic noise propagating through thermal management fluid flow 62 may be mitigated and/or attenuated by the presence of thermal management system 100 when actuator assembly 200 is in the stowed position, in the deployed position, and/or in one or more of the intermediate positions defined between the stowed position and the deployed position. As a more specific example, and as schematically illustrated in FIGS. 1-2, at least a portion of heat exchanger 110 (such as external surface 120 and/or internal surface 130) may be configured to operate as an acoustic liner 34 that attenuates acoustic noise propagating through thermal management fluid flow 62 when actuator assembly 200 is in one or more of the stowed position, the deployed position, and the intermediate position. More specifically, and as schematically illustrated in FIGS. 1-2, external surface 120 may define a plurality of external perforations 122 configured to permit sound waves to traverse external surface 120, and/or internal surface 130 may define a plurality of internal perforations 132 configured to permit sound waves to traverse internal surface 130. In this manner, heat exchanger 110 may be configured such that sound waves (such as may be propagating through and/or otherwise associated with thermal management fluid flow 62) may enter and/or traverse heat transfer region 111 when actuator assembly 200 is in the stowed position, and such that the sound waves may enter housing 140 when actuator assembly 200 is in the deployed position. In such examples, external surface 120 and/or internal surface 130 may restrict fluid from traversing the surface other than via external perforations 122 and/or internal perforations 132. For example, and as schematically illustrated in FIG. 1, housing 140 may define a housing volume 142 such that heat exchanger 110 is at least substantially received within housing volume 142 when actuator assembly 200 is in the stowed position, and external surface 120 may substantially restrict thermal management fluid flow 62 from entering housing volume 142 other than through external perforations 122 when actuator assembly 200 is in the stowed position. Similarly, and as schematically illustrated in FIG. 2, internal surface 130 may substantially restrict thermal management fluid flow 62 from entering housing volume 142 other than through internal perforations 132 when actuator assembly 200 is in the deployed position.

External perforations 122 and/or internal perforations 132 may contribute to acoustic noise attenuation properties of heat exchanger 110. For example, and as schematically illustrated in FIGS. 1-2, thermal management system 100 may include one or more acoustic cavities 150 configured to attenuate acoustic noise, such as may be propagating through and/or otherwise associated with thermal management fluid flow 62. Each acoustic cavity 150 generally is configured to permit sound waves to enter the acoustic cavity 150, such as via external perforations 122 and/or internal perforations 132, and to attenuate an acoustic noise associated with the sound waves by establishing a resonance of the sound waves. In this manner, for example, each acoustic cavity 150 may operate as a Helmholtz resonator.

When present, each acoustic cavity 150 generally is substantially defined by external surface 120, internal surface 130, and/or housing 140. For example, and as schematically illustrated in FIG. 1, when actuator assembly 200 is in the stowed position, external surface 120, internal surface 130, and/or housing 140 collectively may define each acoustic cavity 150. More specifically, and with reference to FIG. 1, when actuator assembly 200 is in the stowed position, sound waves may enter each acoustic cavity 150 that is defined by external surface 120, internal surface 130, and housing 140 from thermal management fluid flow 62 at least substantially and/or only via external perforations 122. Similarly, when actuator assembly 200 is in the stowed position, sound waves may enter each acoustic cavity 150 that is defined by internal surface 130 and housing 140 from thermal management fluid flow 62 at least substantially and/or only via external perforations 122 and internal perforations 132 (and the acoustic cavities 150 defined therebetween). When actuator assembly 200 is in the deployed position (as schematically illustrated in FIG. 2) and/or when actuator assembly 200 is in the intermediate position, internal surface 130 and housing 140 collectively may define each acoustic cavity 150, such that sound waves may enter each acoustic cavity 150 at least substantially and/or only via internal perforations 132.

As further schematically illustrated in FIGS. 1-2, housing 140 additionally may include one or more bulkheads 144 statically extending within housing volume 142 of housing 140 along a direction at least substantially perpendicular to thermal management fluid flow 62. In such examples, each bulkhead 144 at least partially defines one or more acoustic cavities 150. In examples of housing 140 that include one or more bulkheads 144, each bulkhead 144 generally is configured to permit actuator assembly 200 to transition between the stowed position and the deployed position without heat exchanger 110 interfering with bulkhead 144. For example, and as schematically illustrated in FIG. 1, when actuator assembly 200 is in the stowed position, heat exchanger 110 at least partially receives each bulkhead 144, such as within a slot 116 defined by heat exchanger 110.

Heat exchanger 110, external surface 120, internal surface 130, housing 140, and/or bulkhead(s) 144 may have any appropriate respective shapes, sizes, and/or configurations, such as for enhancing acoustic attenuation of sound waves propagating through thermal management fluid flow 62. As examples, the plurality of external perforations 122 and/or the plurality of internal perforations 132 may be configured to yield a porosity of the respective surfaces of heat exchanger 110 that is selected to optimize propagation of sound waves into acoustic cavities 150 and/or to attenuate sound waves. As more specific examples, the plurality of external perforations 122 collectively may yield a porosity of external surface 120 that is at least 1%, at least 3%, at least 5%, at least 10%, at least 15%, at least 20%, at least 30%, at least 40%, at least 50%, at most 55%, at most 45%, at most 35%, at most 25%, at most 17%, at most 12%, at most 7%, or at most 2%. Additionally or alternatively, the plurality of internal perforations 132 collectively may yield a porosity of internal surface 130 that is at least 1%, at least 3%, at least 5%, at least 10%, at least 15%, at least 20%, at least 30%, at least 40%, at least 50%, at most 55%, at most 45%, at most 35%, at most 25%, at most 17%, at most 12%, at most 7%, and/or at most 2%. As used herein, the term "porosity" generally refers to a ratio of a combined surface area of a collection of perforations to a total surface area of a region across which the perforations are distributed.

Additionally, each acoustic cavity 150 may have any appropriate dimensions, such as may be selected to promote a resonance of sound waves of a predetermined frequency. As examples, and as schematically illustrated in FIG. 2, each acoustic cavity 150 may have a cavity length 152, as measured along a direction parallel to thermal management fluid flow 62, that is at least 1 centimeter (cm), at least 3 cm, at least 5 cm, at least 10 cm, at least 15 cm, at most 20 cm, at most 17 cm, at most 12 cm, at most 7 cm, and/or at most 2 cm. As additional examples, and as further schematically illustrated in FIG. 2, each acoustic cavity 150 may have a cavity depth 154, as measured along a direction perpendicular to external surface 120, that is at least 1 cm, at least 3 cm, at least 5 cm, at least 10 cm, at least 15 cm, at most 20 cm, at most 17 cm, at most 12 cm, at most 7 cm, and/or at most 2 cm.

While the examples illustrated and described herein generally pertain to examples in which heat exchanger 110 includes a single external surface 120 and a single internal surface 130, it is additionally within the scope of the present disclosure that heat exchanger 110 may include a plurality of spaced-apart internal surfaces 130, such as may include corresponding pluralities of internal perforations 132. In such examples, each internal surface 130 may include any appropriate aspects, features, and/or configurations of internal surface 130 as discussed herein.

With continued reference to FIGS. 1-2, heat exchanger 110 additionally may include one or more features configured to enhance an aerodynamic property of heat exchanger 110. For example, and as schematically illustrated in FIGS. 1-2, external surface 120 additionally may include a shaped leading edge 124 that is configured to mitigate a drag force imparted on heat exchanger 110 by thermal management fluid flow 62 when actuator assembly 200 is in the deployed position and/or in the stowed position. As examples, shaped leading edge 124 may be curved and/or airfoil-shaped.

Process fluid conduit 160 may include any appropriate portions and/or components for conveying process fluid 50 as described herein. For example, and as schematically illustrated in FIGS. 1-2, process fluid conduit 160 may include a supply conduit 162 and a return conduit 164 such that process fluid 50 is supplied to heat transfer portion 166 via supply conduit 162 and returns from heat transfer portion 166 via return conduit 164. Stated differently, in such examples, each of supply conduit 162 and return conduit 164 is operatively coupled to heat exchanger 110 and is fluidly coupled to heat transfer portion 166 such that process fluid flow 52 flows through supply conduit 162 prior to flowing through heat transfer portion 166 and flows through return conduit 164 subsequent to flowing through heat transfer portion 166.

Supply conduit 162 and/or return conduit 164 may have any appropriate form and/or structure, such as to facilitate actuator assembly 200 transitioning between the stowed position and the deployed position. For example, supply conduit 162 and/or return conduit 164 may include and/or be a flexible tube configured to passively deform as actuator assembly 200 transitions between the stowed position and the deployed position. Additionally or alternatively, and as described herein, supply conduit 162 and/or return conduit 164 may include a portion of actuator assembly 200, for example such that supply conduit 162 and/or return conduit 164 actively deforms to transition actuator assembly 200 between the stowed position and the deployed position. As examples, and as described herein, supply conduit 162 and/or return conduit 164 may include and/or be SMA actuator 210.

Process fluid 50 and/or thermal management fluid 60 may include and/or be any appropriate fluids such that thermal management fluid 60 may be utilized to regulate a temperature of process fluid 50. As examples, process fluid 50 may include and/or be a liquid, water, a coolant, propylene glycol, ethylene glycol, a lubricant, and/or an oil. As additional examples, thermal management fluid 60 may include and/or be a gas, air, a liquid, water, and/or an organic compound. As a more specific example, and as discussed in more detail below with reference to FIGS. 18-19, process fluid 50 may be an engine oil, and thermal management fluid 60 may be air, such that a flow of the air relative to the engine may be utilized to cool the engine oil. As another example, process fluid 50 may be a coolant oil that is utilized by an electrical generator, and thermal management fluid 60 may be air, such that a flow of the air relative to the electrical generator may be utilized to cool the coolant oil, thereby facilitating a cooling of the electrical generator.

As discussed, thermal management system 100 generally is configured to bring process fluid 50 into thermal communication with thermal management fluid 60 within heat transfer region 111 to change the temperature of process fluid 50 during operative use of thermal management system 100, such as when actuator assembly 200 is in the deployed position and/or when actuator assembly 200 is in any of the intermediate positions. In some examples, thermal management system 100 may be configured to decrease the temperature of process fluid 50. In such examples, thermal management system 100 may be configured such that actuator assembly 200 automatically transitions from the stowed position toward the deployed position when the temperature of process fluid 50 rises above a predetermined lower threshold temperature, and/or such that actuator assembly 200 automatically transitions from the deployed position toward the stowed position when the temperature of process fluid 50 falls below a predetermined upper threshold temperature. Alternatively, thermal management system 100 may be configured to increase the temperature of process fluid 50. In such examples, thermal management system 100 may be configured such that actuator assembly 200 automatically transitions from the stowed position toward the deployed position when the temperature of process fluid 50 falls below a predetermined upper threshold temperature, and/or such that actuator assembly 200 automatically transitions from the deployed position toward the stowed position when the temperature of process fluid 50 rises above a predetermined lower threshold temperature. In all examples, thermal management system 100 also may be configured such that actuator assembly 200 assumes and/or remains in the stowed position when the temperature of process fluid 50 is within a nominal temperature range. Additionally or alternatively, in all examples, thermal management system 100 also may be configured such that actuator assembly 200 assumes and/or remains in an intermediate position defined between the stowed position and the deployed position when the temperature of process fluid 50 is between the predetermined lower threshold temperature and the predetermined upper threshold temperature.

Thermal management system 100, heat exchanger 110, process fluid conduit 160, and/or heat transfer portion 166 may be configured to facilitate and/or enhance thermal communication between process fluid 50 and thermal management fluid 60 in any appropriate manner. For example, and as schematically illustrated in FIGS. 1-2, heat transfer portion 166 may include a plurality of heat transfer passages 168 extending within heat transfer region 111 such that process fluid 50 flows through each of the plurality of heat transfer passages 168 during operative use of thermal management system 100. In such examples, process fluid conduit 160 additionally may include a supply manifold 172 and/or a return manifold 174 configured such that process fluid flow 52 flows sequentially from supply manifold 172 through one or more heat transfer passages 168 and to return manifold 174. Stated differently, supply manifold 172 may be configured to supply process fluid flow 52 to each of the plurality of heat transfer passages 168, and/or return manifold 174 may be configured to collect process fluid flow 52 from each of the plurality of heat transfer passages 168. In such examples, supply manifold 172 and/or return manifold 174 may be statically coupled to heat exchanger 110, for example such that supply manifold 172 and/or return manifold 174 moves with heat exchanger 110 as actuator assembly 200 transitions between the stowed configuration and the deployed configuration.

Figure 3:
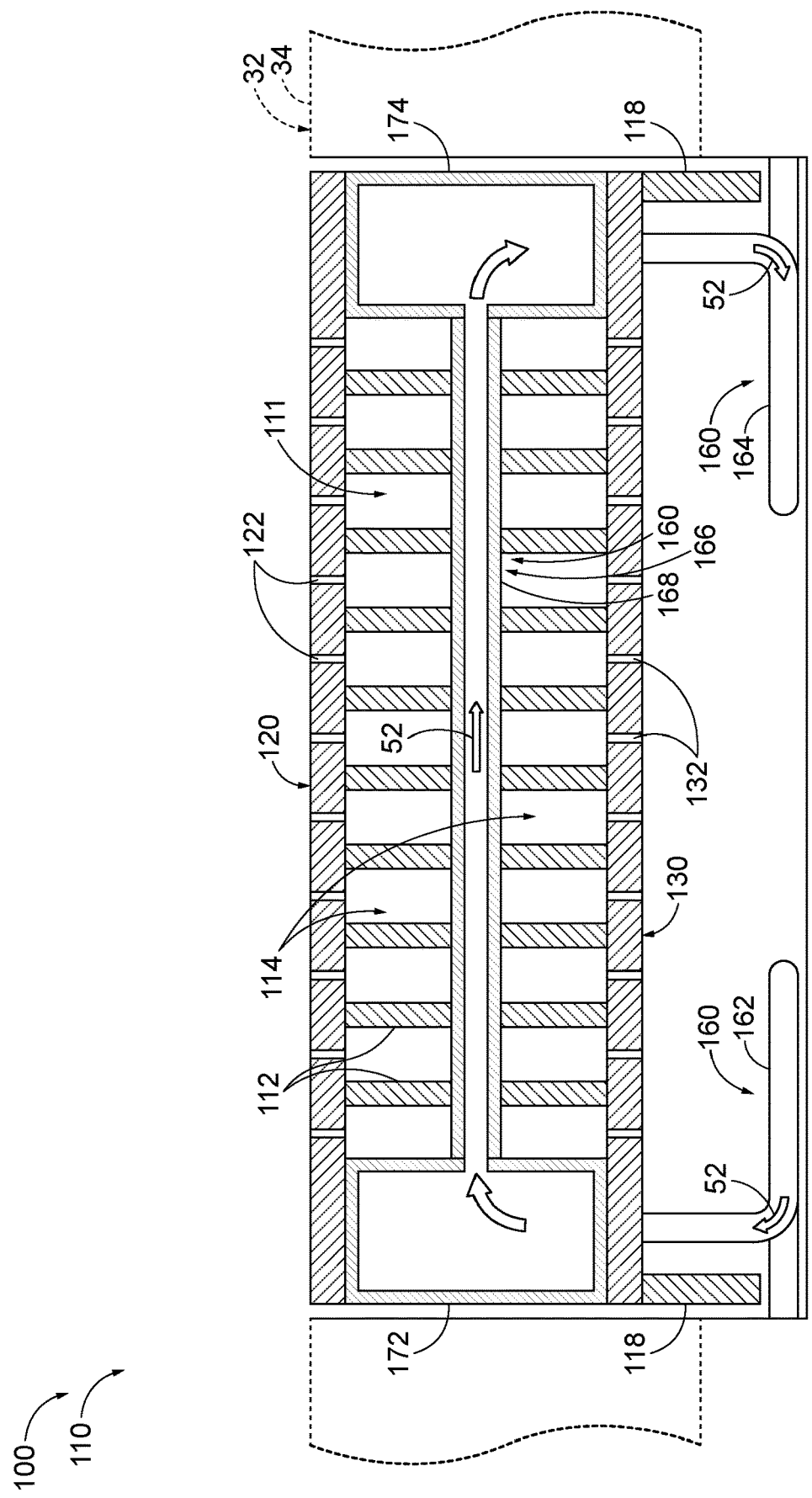
FIG. 3 is schematic front elevation view illustrating an example of a thermal management system with a heat exchanger in a stowed position, according to the present disclosure.
Figure 4:
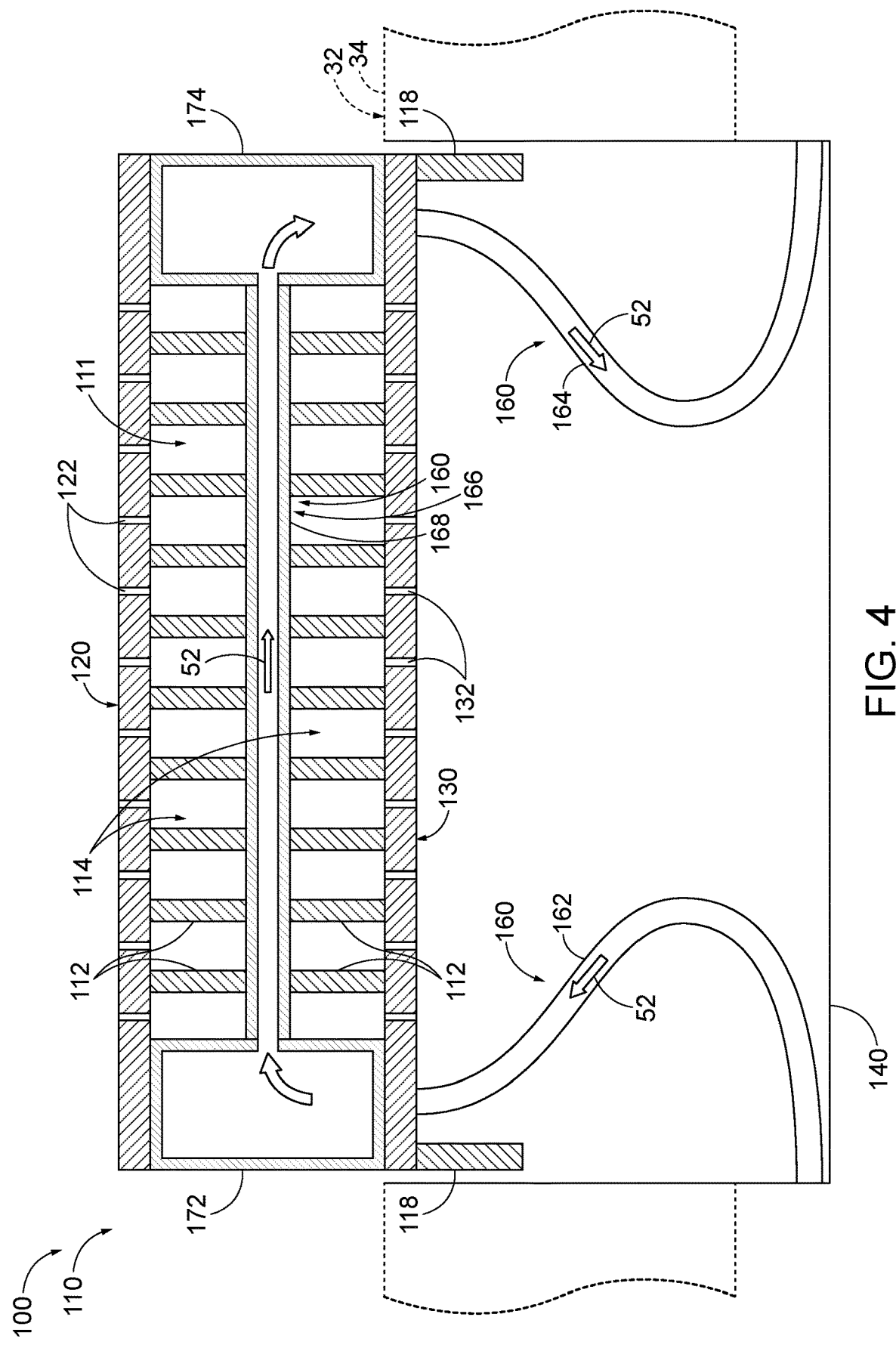
FIG. 4 is a schematic front elevation view illustrating the thermal management system of FIG. 3 with the heat exchanger in the deployed position, according to the present disclosure.

Examples of supply manifold 172 and return manifold 174 are schematically illustrated in FIGS. 1-4, and are perhaps best understood with reference to FIGS. 3-4. Specifically, FIG. 3 schematically illustrates selected components of examples of heat exchangers 110 according to the present disclosure and represents a cross-sectional view taken along the line 3-3 in FIG. 1. Similarly, FIG. 4 represents a cross-sectional view taken along the line 4-4 in FIG. 2. In this manner, FIG. 3 may be described as illustrating thermal management system 100 with heat exchanger 110 in the stowed position, while FIG. 4 may be described as illustrating thermal management system 100 with heat exchanger 110 in the deployed position. FIGS. 3-4 additionally may be described as illustrating an example in which each of supply conduit 162 and return conduit 164 includes a flexible tube. FIGS. 3-4 illustrate an example of thermal management system 100 in which process fluid flow 52 flows sequentially from supply conduit 162 to supply manifold 172, through one or more heat transfer passages 168 (one of which is visible in FIGS. 3-4), to return manifold 174, and through return conduit 164.

Heat transfer passages 168 may extend through and/or occupy heat transfer region 111 in any appropriate manner, such as may be configured to facilitate thermal communication between process fluid flow 52 within heat transfer passages 168 and thermal management fluid flow 62 exterior of heat transfer passages 168. Additionally, heat transfer passages 168 may be arranged, spaced, and/or otherwise configured to permit sound waves to propagate between external surface 120 and internal surface 130, such as from external surface 120 to internal surface 130 and/or from internal surface 130 to external surface 120. Stated differently, and as schematically illustrated in FIGS. 1-2, the plurality of heat transfer passages 168 may define a plurality of gaps therebetween such that sound waves (such as may be propagating through and/or otherwise associated with thermal management fluid 60) may traverse heat transfer portion 166. For example, heat transfer region 111 may be described as encompassing a heat transfer region area, as measured within a plane that extends parallel to thermal management fluid flow 62, and the plurality of heat transfer passages 168 collectively may occupy a passage cross-sectional area, as measured in the plane that extends parallel to thermal management fluid flow 62, that is at least 10%, at least 15%, at least 20%, at least 30%, at least 40%, at least 50%, at most 90%, at most 75%, at most 45%, at most 35%, at most 25%, at most 17%, and/or at most 12% of the heat transfer region area.

As additionally schematically illustrated in FIGS. 1-4, heat exchanger 110 further may include one or more heat spreaders 112 in thermal communication and/or direct contact with heat transfer portion 166. When present, heat spreader 112 is configured to enhance the thermal communication between thermal management fluid 60 that flows through heat transfer region 111 and process fluid 50 that flows within heat transfer portion 166. As schematically illustrated in FIGS. 1-2, heat spreader 112 may be at least substantially positioned within heat transfer region 111, and/or may be at least substantially positioned between external surface 120 and internal surface 130. Heat spreader 112 may include and/or be any suitable heat spreader such as is known in the field of thermal management, examples of which include a heat sink, a fin, and/or a plate.

When present, heat spreader 112 generally is configured to permit a flow of fluid through heat transfer region 111. Stated differently, heat spreader 112 may be shaped, positioned, and/or otherwise configured to permit thermal management fluid 60 (and/or any other fluid) to flow through heat transfer region 111 without being substantially restricted by heat spreader 112. For example, and as schematically illustrated in FIGS. 1-2, heat spreader 112 may define a plurality of heat spreader passages 114 configured to permit fluid and/or sound waves to traverse heat spreader 112, such as from external surface 120 to internal surface 130 (or vice versa). Additionally or alternatively, and as schematically illustrated in FIGS. 3-4, heat spreader 112 may include and/or substantially consist of a plurality of spaced-apart plates such that thermal management fluid 60 may flow through heat transfer region 111 along the direction of thermal management fluid flow 62 during operative use of thermal management system 100. In such an example, the voids defined between adjacent plates may be referred to as heat spreader passages 114. In this manner, heat spreader passages 114 may be configured to permit thermal management fluid flow 62 to flow through heat transfer region 111, such as in the manner schematically illustrated in FIG. 2. Such a configuration also may permit sound waves to propagate through heat transfer region 111, such as from external surface 120 to internal surface 130.

As discussed, process fluid flow 52 generally flows through heat transfer portion 166 and/or through one or more heat transfer passages 168 when actuator assembly 200 is in the deployed position so as to establish thermal communication between process fluid flow 52 and thermal management fluid flow 62. It is additionally within the scope of the present disclosure that process fluid flow 52 flows through heat transfer portion 166 and/or through one or more heat transfer passages 168 when actuator assembly 200 is in any of the plurality of positions defined between and including the stowed position and the deployed position. Stated differently, thermal management systems 100 according to the present disclosure may be configured such that process fluid flow 52 flows through process fluid conduit 160 (and/or through any portion thereof) regardless of the configuration of actuator assembly 200.

Figure 5:
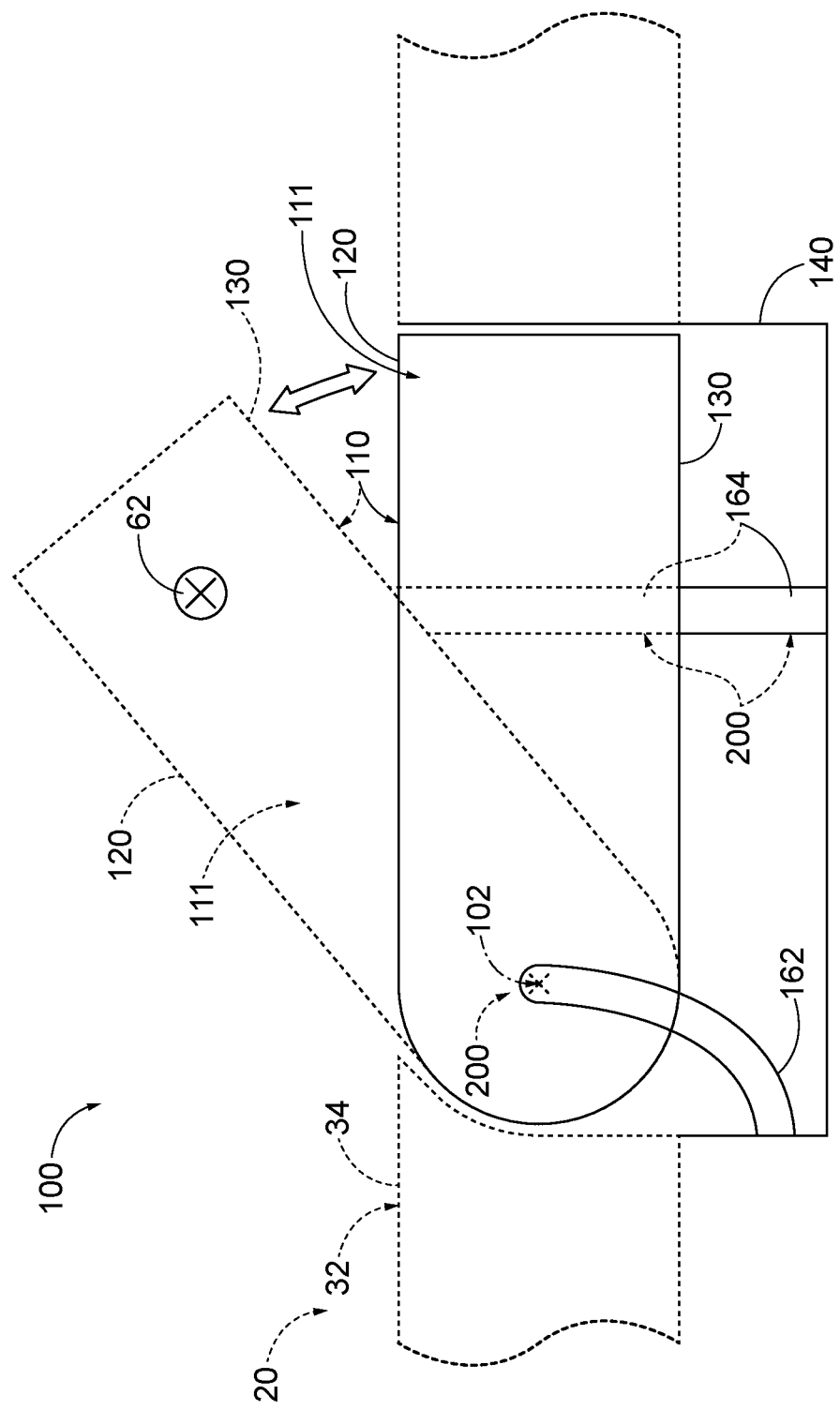
FIG. 5 is a schematic fragmentary front elevation view illustrating examples of thermal management systems with a heat exchanger that pivots relative to a housing, according to the present disclosure.

FIGS. 1-4 generally correspond to examples in which heat exchanger 110 translates relative to housing 140 as actuator assembly 200 transitions between the stowed position and the deployed position. However, this is not required, and it is additionally within the scope of the present disclosure that actuator assembly 200 may transition heat exchanger 110 into and out of thermal management fluid flow 62 via pivotal and/or rotational motion. FIG. 5 schematically illustrates such an example of thermal management system 100. Specifically, and as schematically illustrated in FIG. 5, heat exchanger 110 may be configured to pivot relative to housing 140 about a pivot axis 102 as actuator assembly 200 transitions between the stowed position (illustrated in solid lines) and the deployed position (illustrated in dashed lines). Such a configuration may enable supply conduit 162 or return conduit 164 to remain at least substantially stationary as actuator assembly 200 transitions between the stowed position and the deployed position. Stated differently, such a configuration may enable supply conduit 162 or return conduit 164 to remain at a substantially static location relative to housing 140 as actuator assembly 200 transitions between the stowed position and the deployed position. Such a configuration may serve to mitigate a mechanical wear endured by process fluid conduit 160 as heat exchanger 110 is deployed from and returned to housing 140. FIG. 5 schematically illustrates an example in which pivot axis 102 is at least substantially parallel to thermal management fluid flow 62. However, this is not required, and it is additionally within the scope of the present disclosure that pivot axis 102 may be at least partially, and/or at least substantially, perpendicular to thermal management fluid flow 62.

As discussed, thermal management system 100 may be configured such that actuator assembly 200 automatically transitions between the stowed position and the deployed position based upon the temperature of process fluid 50, such as may be achieved by SMA actuator 210. More specifically, SMA actuator 210 generally is configured to assume a conformation among a plurality of conformations defined between and including a first conformation and a second conformation, such that the position of actuator assembly 200 is at least partially based on the conformation of SMA actuator 210. When present, SMA actuator 210 is configured to be in thermal contact with process fluid 50 such that the conformation of SMA actuator 210 is based, at least in part, on the temperature of process fluid 50 that is in thermal contact with SMA actuator 210. Accordingly, in an example of actuator assembly 200 that includes SMA actuator 210, actuator assembly 200 may be configured to automatically assume a position among the plurality of positions based upon the conformation of SMA actuator 210, which in turn is based upon the temperature of process fluid 50. More specifically, actuator assembly 200 may be in the stowed position when SMA actuator 210 is in the first conformation, and actuator assembly 200 may be in the deployed position when SMA actuator 210 is in the second conformation. Similarly, actuator assembly 200 may be in the intermediate position when SMA actuator 210 is in an intermediate conformation defined between the first conformation and the second conformation.

SMA actuator 210 may have any appropriate form, construction, and/or functionality, examples of which are provided in U.S. patent application Ser. No. 15/901,779, the complete disclosure of which is hereby incorporated by reference. As schematically illustrated in FIGS. 1-2, SMA actuator 210 may be at least substantially formed of an SMA material 211, such as may be specifically trained and/or configured to transition between the first conformation and the second conformation to transition actuator assembly 200 between the stowed position and the deployed position. SMA material 211 may include and/or be any appropriate material, examples of which include a binary alloy; a nickel-titanium alloy; a binary nickel-titanium alloy; a ternary alloy; a ternary alloy that includes nickel and titanium; a ternary nickel-titanium-palladium alloy; a ternary manganese-nickel-cobalt alloy; a quaternary alloy; a quaternary alloy that includes nickel and titanium; and/or an alloy that includes at least one of nickel, titanium, palladium, manganese, hafnium, copper, iron, silver, cobalt, chromium, and vanadium.

SMA material 211 may have and/or be characterized by a crystalline structure thereof. For example, SMA material 211 may be configured to transition from a martensite state to an austenite state responsive to the temperature of SMA material 211 increasing, and may be configured to transition from the austenite state to the martensite state responsive to the temperature of SMA material 211 decreasing. In such an embodiment, SMA actuator 210 may be in the first conformation when SMA material 211 is in the martensite state, and SMA actuator 210 may be in the second conformation when SMA material 211 in the austenite state. Alternatively, SMA actuator 210 may be in the first conformation when SMA material 211 is in the austenite state, and SMA actuator 210 may be in the second conformation when SMA material 211 in the martensite state.

Figure 6:
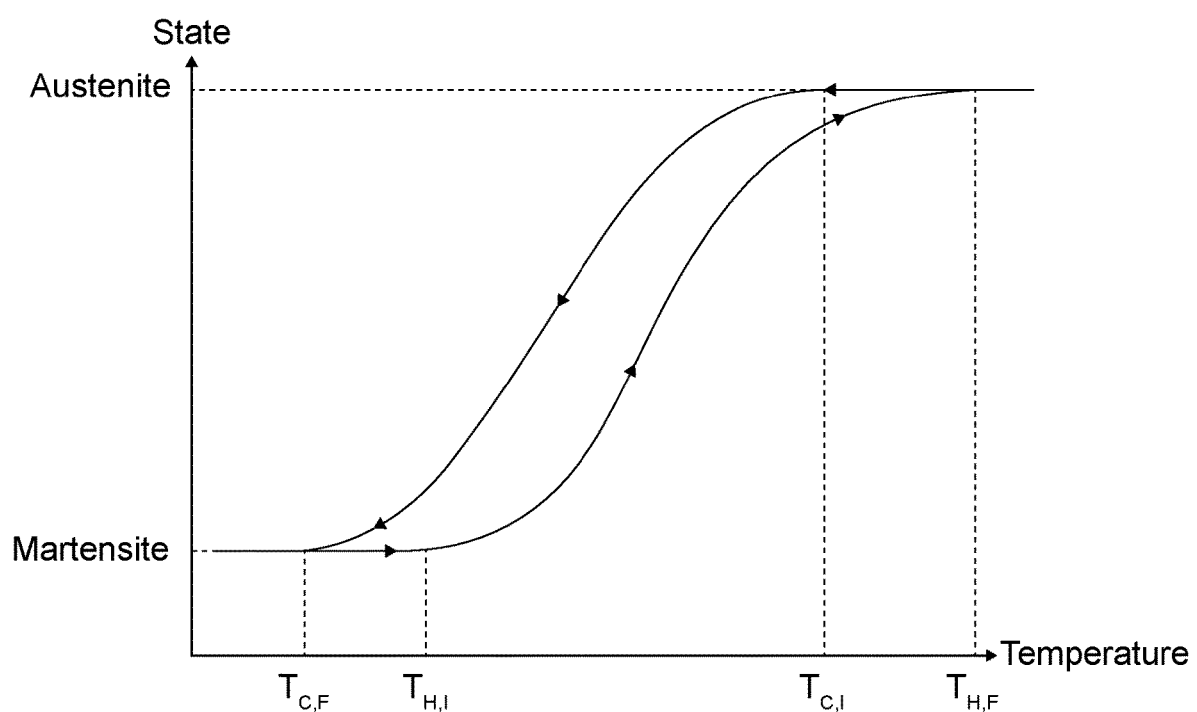
FIG. 6 is an illustration of a hysteresis curve, according to the present disclosure.

A temperature-dependent transition between the austenite state and the martensite state of SMA material 211 may have any appropriate form. As an example, FIG. 6 illustrates a hysteresis curve that represents a relationship between the state of SMA material 211 and the temperature of SMA material 211. As illustrated in FIG. 6, SMA material 211 may be configured to begin a transition from the martensite state to the austenite state when SMA material 211 reaches an initial heating temperature (labeled $T_{H,I}$ in FIG. 6) from below (i.e., from a temperature that is lower than the initial heating temperature). SMA material 211 may be configured to transition from the martensite state to the austenite state as the temperature of SMA material 211 is increased. Specifically, and as illustrated in FIG. 6, SMA material 211 may be configured to complete the transition from the martensite state to the austenite state upon reaching a final heating temperature (labeled $T_{H,F}$ in FIG. 6) that is greater than the initial heating temperature.

As further illustrated in FIG. 6, SMA material 211 may be configured to begin a transition from the austenite state to the martensite state upon reaching an initial cooling temperature (labeled $T_{C,I}$ in FIG. 6) from above (i.e., from a temperature that is greater than the initial cooling temperature). SMA material 211 may be configured to transition from the austenite state to the martensite state as the temperature of SMA material 211 is decreased. Specifically, and as illustrated in FIG. 6, SMA material 211 may be configured to complete the transition from the austenite state to the martensite state upon reaching a final cooling temperature (labeled $T_{C,F}$ in FIG. 6) that is less than the initial cooling temperature. As additionally illustrated in FIG. 6, the initial heating temperature may be greater than the final cooling temperature, and/or the final heating temperature may be greater than the initial cooling temperature.

In this manner, and as illustrated in FIG. 6, a crystalline structure of SMA material 211 (and hence the conformation of SMA actuator 210) may depend upon both the temperature of SMA material 211 as well as a history of the temperature of SMA material 211 when the temperature is between the final cooling temperature and the final heating temperature. However, and as further illustrated in FIG. 6, SMA material 211 may be configured to remain in the austenite state when the temperature of SMA material 211 is greater than the final heating temperature, and/or may be configured to remain in the martensite state when the temperature of SMA material 211 is less than the final cooling temperature. Accordingly, SMA material 211 may be configured and/or calibrated such that the final cooling temperature is higher than a minimum operational temperature of SMA material 211 and/or of process fluid 50, and/or such that the final heating temperature is lower than a maximum operational temperature of SMA material 211 and/or of process fluid 50. Stated differently, SMA material 211 may be selected, tailored, trained, and/or otherwise configured such that the minimum and/or maximum operational temperatures of SMA material 211 correspond to the minimum and/or maximum expected and/or desired temperatures of process fluid 50. Such a configuration may facilitate a precise and/or reliable determination of a position of actuator assembly 200 as SMA material 211 is transitioned between the minimum operational temperature and the maximum operational temperature.

SMA actuator 210 may be incorporated into thermal management system 100 in any appropriate manner to transition actuator assembly 200 between the stowed position and the deployed position as described herein. For example, and as schematically illustrated in FIGS. 1-2, process fluid conduit 160 may include SMA actuator 210 such that process fluid 50 flows through at least a portion of SMA actuator 210. FIGS. 7-10 illustrate more specific examples of SMA actuators 210, as discussed in more detail herein. With reference to FIGS. 7-10, process fluid conduit 160 may be configured such that process fluid flow 52 flows through SMA actuator 210 from an upstream end 216 of SMA actuator 210 to a downstream end 218 of SMA actuator 210.

In examples in which process fluid 50 flows through SMA actuator 210, process fluid 50 may flow through SMA actuator 210 in any appropriate portion of process fluid conduit 160. For example, process fluid conduit 160 may be configured to such that process fluid 50 flows through heat transfer portion 166 subsequent to flowing through SMA actuator 210, prior to flowing through SMA actuator 210, and/or at least partially concurrent with flowing through SMA actuator 210. Additionally or alternatively, thermal management system 100 may be configured to change the temperature of process fluid 50 (via thermal communication with thermal management fluid flow 62) subsequent to process fluid 50 flowing through SMA actuator 210, prior to process fluid 50 flowing through SMA actuator 210, and/or at least partially concurrent with process fluid 50 flowing through SMA actuator 210.

Figure 7:
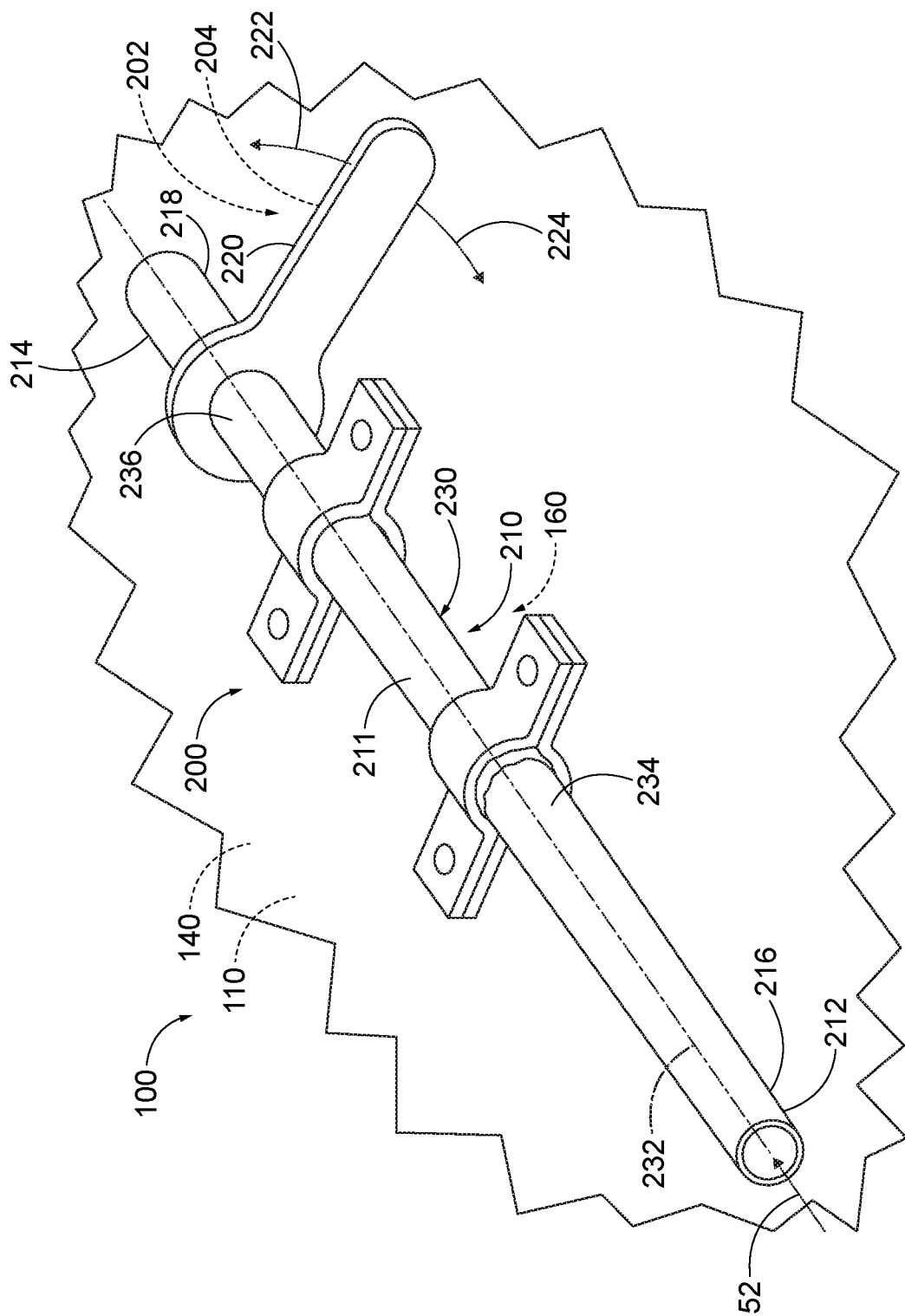
FIG. 7 is a cutaway top side perspective view illustrating an example of a shape memory alloy (SMA) actuator that includes an SMA torque tube, according to the present disclosure.

SMA actuator 210 may assume any appropriate form and/or configuration for transitioning actuator assembly 200 between the stowed position and the deployed position. For example, FIG. 7 illustrates an example in which SMA actuator 210 includes an SMA torque tube 230 configured to produce a torque as SMA actuator 210 transitions between the first conformation and the second conformation. In such examples, and as illustrated in FIG. 7, SMA torque tube 230 may be tubular and/or cylindrical. Additionally or alternatively, SMA torque tube 230 may be characterized by a longitudinal axis 232 such that SMA torque tube 230 is configured to twist about longitudinal axis 232 as SMA actuator 210 transitions between the first conformation and the second conformation. Thus, in such examples, SMA torque tube 230 twisting about longitudinal axis 232 operates to transition actuator assembly 200 between the stowed position and the deployed position.

As illustrated in FIG. 7, at least a portion of SMA torque tube 230 may be fixedly and/or statically coupled to at least a portion of a remainder of thermal management system 100, such as heat exchanger 110 and/or housing 140. More specifically, and as shown in FIG. 7, SMA torque tube 230 may be described as including a static portion 234 that is fixedly coupled to heat exchanger 110 or to housing 140 and an active portion 236 configured to twist relative to static portion 234. As further illustrated in FIG. 7, actuator assembly 200 additionally may include an actuation element 220 that is fixedly coupled to active portion 236 and that extends away from SMA torque tube 230. In this manner, the twisting of SMA torque tube 230 about longitudinal axis 232 results in a rotation of actuation element 220 about longitudinal axis 232, such as may be utilized to translate and/or rotate heat exchanger 110 relative to housing 140. More specifically, and as shown in FIG. 7, actuation element 220 may be configured to rotate relative to longitudinal axis 232 in a first direction 222 as SMA actuator 210 transitions from the first conformation toward the second conformation, and may be configured to rotate relative to longitudinal axis 232 in a second direction 224 that is opposite first direction 222 as SMA actuator 210 transitions from the second conformation toward the first conformation.

As further illustrated in FIG. 7, in examples of SMA actuator 210 that include SMA torque tube 230, actuator assembly 200 may include a linkage mechanism 202 that is configured to convert twisting motion of active portion 236 into a force (such as a linear force and/or a torque) to transition actuator assembly 200 between the stowed position and the deployed position and/or to translate and/or rotate heat exchanger 110 relative to housing 140. At least a portion of linkage mechanism 202 may be fixedly coupled to active portion 236. For example, linkage mechanism 202 may include actuation element 220 fixedly coupled to active portion 236. Additionally or alternatively, and as illustrated in FIG. 7, linkage mechanism 202 may include one or more actuator arms 204, such as may be fixedly coupled to active portion 236. In such examples, and as shown in FIG. 7, actuation element 220 may include and/or be actuator arm 204, and/or linkage mechanism 202 may be described as including actuation element 220. As used herein, the term "fixedly coupled," as used to describe a connection between a first component and a second component, refers to a configuration in which the first component is statically coupled to the second component in such a manner that the two components move, translate, pivot, and/or rotate in unison. For example, as used herein, actuation element 220 may be described as being fixedly coupled to active portion 236 when actuation element 220 is operatively coupled to active portion 236 such that actuation element 220 rotates about longitudinal axis 232 as active portion 236 twists about longitudinal axis 232. It is additionally within the present disclosure that one or more components of linkage mechanism 202 may be rotatably coupled and/or hingedly coupled to a portion of SMA torque tube 230, such as active portion 236. In such examples, a twisting of active portion 236 may operate to translate and/or rotate heat exchanger 110 relative to housing 140 via a rotational and/or hinged coupling between SMA torque tube 230 and linkage mechanism 202.

As used herein, and as described in more detail below, actuator arm 204 generally refers to a component of linkage mechanism 202 such that at least a portion of actuator arm 204 is configured to rotate with respect to one of housing 140 and heat exchanger 110 and such that at least a portion of actuator arm 204 is configured to translate with respect to the other of housing 140 and heat exchanger 110. In this manner, actuator arm 204 may be described as enabling the conversion of a rotation (such as the twisting of SMA torque tube 230) to a translation (such as a translation of heat exchanger 110 relative to housing 140 as actuator assembly 200 transitions between the stowed position and the deployed position). As a more specific example, static portion 234 of SMA torque tube 230 may be fixedly coupled to housing 140, and at least a portion of linkage mechanism 202 may be fixedly coupled to heat exchanger 110. Alternatively, static portion 234 may be fixedly coupled to heat exchanger 110, and at least a portion of linkage mechanism 202 may be fixedly coupled to housing 140.

In other embodiments, SMA actuator 210 may be configured to transition between the first conformation and the second conformation at least substantially via a translation of and/or within SMA actuator 210. In such embodiments, SMA actuator 210 may be described as including and/or being an SMA lifting tube 250 that is configured to be in thermal communication with process fluid 50. More specifically, SMA lifting tube 250 may be a hollow SMA lifting tube 250 configured to permit process fluid flow 52 of process fluid 50 to flow therethrough and in thermal contact with SMA lifting tube 250. FIGS. 8-10 illustrate examples of SMA actuators 210 that include SMA lifting tubes 250.

Specifically, as illustrated in FIGS. 8-10, SMA lifting tube 250 generally includes and extends between a first end 212 and a second end 214 such that second end 214 is configured to translate relative to first end 212 (or, equivalently, vice versa). More specifically, and as illustrated in FIGS. 8-10, SMA lifting tube 250 is configured such that second end 214 translates relative to first end 212 at least partially along a lateral direction 226 that is at least substantially perpendicular to at least a portion of SMA lifting tube 250 between first end 212 and second end 214 as SMA actuator 210 transitions between the first conformation and the second conformation. In this manner, SMA lifting tube 250 may be configured to perform work on a load that is operatively coupled to SMA lifting tube 250 as SMA actuator 210 transitions between the first conformation and the second conformation. For example, in an example in which first end 212 is operatively coupled to a first component and second end 214 is operatively coupled to a second component, SMA actuator 210 may be configured to translate the first component and the second component relative to one another at least partially along lateral direction 226 as SMA actuator 210 transitions between the first conformation and the second conformation. As more specific examples, SMA actuator 210 may be configured to exert a force to push the first component and the second component away from one another, and/or may be configured to exert a force to pull the first component and the second component toward one another. Additionally or alternatively, SMA actuator 210 and/or SMA lifting tube 250 may be configured to restrict second end 214 from translating relative to first end 212 along lateral direction 226 when SMA material 211 is in a given (i.e., substantially constant) state defined between and including the martensite state and the austenite state. Stated differently, SMA actuator 210 and/or SMA lifting tube 250 may be substantially rigid at least when actuator assembly 200 is not actively transitioning between the stowed position and the deployed position and/or when SMA actuator 210 is not actively transitioning between the first conformation and the second conformation. As shown in FIG. 6, and as discussed herein, SMA material 211 being maintained in a given state may correspond to SMA material 211 and/or SMA lifting tube 250 being maintained at a substantially constant temperature, such as may be the case when process fluid 50 flowing through SMA lifting tube 250 is at a temperature that is substantially constant (in time and/or across a length of SMA lifting tube). For example, and as schematically illustrated in FIGS. 8-10, SMA lifting tube 250 may be characterized by a separation distance 260 between first end 212 and second end 214 as measured along a direction parallel to lateral direction 226, and SMA actuator 210 may be configured to maintain first end 212 and second end 214 at a substantially constant separation distance 260 when process fluid 50 flowing in thermal communication with SMA lifting tube 250 is at a substantially constant temperature such that SMA material 211 is at a substantially constant temperature. In this manner, when process fluid 50 flowing in thermal communication with SMA lifting tube 250 is at a temperature that is substantially constant in time and across the length of SMA lifting tube 250, SMA lifting tube 250 may be sufficiently rigid to maintain actuator assembly 200 in a given position defined between and including the stowed position and the deployed position. Stated differently, SMA lifting tube 250 may be sufficiently rigid to resist actuator assembly 200 from transitioning between the stowed position and the deployed position other than via a temperature-induced change in the state of SMA material 211. In some examples, SMA lifting tube 250 is configured such that first end 212 and second end 214 are at least substantially maintained in a fixed rotational orientation relative to one another as SMA actuator 210 transitions between the first conformation and the second conformation, and/or as actuator assembly 200 that includes SMA lifting tube 250 transitions between the stowed position and the deployed position. Such functionality is schematically illustrated in FIGS. 8-10 via elongate indicators affixed to (e.g., painted onto) each of first end 212 and second end 214 in each Figure. In this manner, FIGS. 8-9 illustrate second end 214 as being is in the same rotational orientation (both in an absolute sense and relative to first end 212) whether SMA actuator 210 is in the first conformation (FIG. 8) or in the second conformation (FIG. 9). Similarly, FIG. 10 illustrates second end 214 as being in the same rotational orientation (both in an absolute sense and relative to first end 212) whether SMA actuator 210 is in the first conformation (solid lines) or in the second conformation (dashed lines). Such a configuration may be beneficial in an example in which SMA lifting tube 250 forms a portion of a conduit (such as process fluid conduit 160) since this configuration permits non-rotating couplings to be made to each of first end 212 and second end 214 while exerting no or minimal torque on such couplings as SMA actuator 210 transitions between the first conformation and the second conformation.

As discussed, SMA lifting tube 250 generally may be configured to permit a fluid (such as process fluid 50) to flow through SMA lifting tube 250. In such examples, and as illustrated in FIGS. 8-10, first end 212 may include and/or be upstream end 216 of SMA lifting tube 250 and second end 214 may include and/or be downstream end 218 of SMA lifting tube 250, such that process fluid 50 flows through SMA lifting tube 250 from upstream end 216 to downstream end 218. In such an example, lateral direction 226 may be described as being at least substantially perpendicular to a direction of process fluid flow 52 of process fluid 50 within at least a portion of SMA lifting tube 250, such as a direction of process fluid flow 52 adjacent to and downstream of upstream end 216 and/or adjacent to and upstream of downstream end 218. While FIGS. 8-10 illustrate process fluid 50 as flowing from first end 212 to second end 214, this is not required, and it is additionally within the scope of the present disclosure that SMA lifting tube 250 is configured such that process fluid 50 flows from second end 214 to first end 212. In such embodiments, second end 214 may include and/or be upstream end 216 and first end 212 may include and/or be downstream end 218.

SMA lifting tube 250 may have any appropriate shape and/or configuration for producing a translation between first end 212 and second end 214. As examples, SMA lifting tube 250 may extend along a path that is helical, cylindrical, S-shaped, U-shaped, and/or coil-shaped. As a more specific example, and as shown in FIGS. 8-9, SMA lifting tube 250 may include and/or be an SMA coil 252 that extends at least substantially within a coil plane 254 when SMA actuator 210 is in the first conformation or in the second conformation. In such examples, lateral direction 226 may be at least substantially perpendicular to coil plane 254, such that SMA coil 252 deforms along lateral direction 226 to transition SMA actuator 210 between the first conformation and the second conformation. For example, FIG. 8 may be described as illustrating SMA actuator 210 in the first conformation, and FIG. 9 may be described as illustrating SMA actuator 210 in the second conformation.

FIG. 10 illustrates an additional example of SMA lifting tube 250. In the example of FIG. 10, SMA lifting tube 250 is substantially S-shaped and is configured such that first end 212 travels relative to second end 214 at least partially along a transverse direction 228 that is perpendicular to lateral direction 226 as SMA actuator 210 transitions between the first conformation (solid lines) and the second conformation (dashed lines). More specifically, in the example of FIG. 10, second end 214 is configured to move relative to first end 212 along an arcuate path that may be characterized as including both a translation partially along lateral direction 226 and a translation partially along transverse direction 228.

FIGS. 11-16 illustrate examples of thermal management systems 100 with actuator assemblies 200 and/or SMA actuators 210 in various configurations. Specifically, thermal management systems 100 of FIGS. 11-16 include heat exchangers 110 that are substantially identical but that are transitioned between the stowed position (FIGS. 11,13, and 15) and the deployed position (FIGS. 12,14, and 16) by distinct mechanisms.

FIGS. 11-12 illustrate an example in which actuator assembly 200 includes SMA torque tube 230 that is at least partially statically coupled to housing 140 and actuation element 220 extending away from SMA torque tube 230. As shown in FIGS. 11-12, an end of actuation element 220 that is distal SMA torque tube 230 (and/or a pin rotatably coupled to such an end) is slidably received within a guide slot such that rotation of actuation element 220 corresponds with the end of actuation element 220 sliding within the guide slot. In this manner, twisting of SMA torque tube 230 results in rotation of actuation element 220, which in turn serves to transition actuator assembly 200 between the stowed position (FIG. 11) and the deployed position (FIG. 12). Accordingly, and as shown in FIGS. 11-12, actuation element 220 may be described as representing actuator arm 204 of linkage mechanism 202, as described above. In the example of FIGS. 11-12, each of supply conduit 162 and return conduit 164 takes the form of a flexible tube.

FIGS. 13-14 illustrate another example in which actuator assembly 200 includes SMA torque tube 230 and actuation element 220 extending away from SMA torque tube 230. In the example of FIGS. 13-14, SMA torque tube 230 is operatively coupled to heat exchanger 110 and at least partially received within heat transfer region 111 of heat exchanger 110 such that process fluid 50 that flows through SMA torque tube 230 is in thermal communication with thermal management fluid 60 when actuator assembly 200 is in the deployed position and during operative use of thermal management system 100. To facilitate such thermal communication, in the example of FIGS. 13-14, actuator assembly 200 further includes an instance of heat spreader 112 in the form of one or more discs affixed to SMA torque tube 230.

FIGS. 13-14 additionally illustrate an example in which actuator assembly 200 includes linkage mechanism 202. In the example of FIGS. 13-14, linkage mechanism 202 serves to operatively couple SMA torque tube 230 to housing 140. Specifically, in the example of FIGS. 13-14, linkage mechanism 202 includes actuation element 220 extending from SMA torque tube 230, as well as actuator arm 204 that is rotatably coupled to internal surface 130 of heat exchanger 110 and slidingly coupled to housing 140 via a guide slot. Actuation element 220 is operatively coupled to actuator arm 204 via an intermediate element. Thus, in the example of FIGS. 13-14, a twisting of SMA torque tube 230 yields a rotation of actuation element 220, urging actuator arm 204 to slide relative to housing 140, which in turn produces a translation of heat exchanger 110 relative to housing 140.

FIGS. 15-16 illustrate an example in which actuator assembly 200 includes one or more SMA lifting tubes 250. Specifically, in the example of FIGS. 15-16, return conduit 164 includes SMA lifting tube 250 such that SMA actuator 210 transitioning between the first conformation and the second conformation serves to translate heat exchanger 110 relative to housing 140 via a linear force. In such examples, supply conduit 162 may include and/or be a flexible tube. In other examples, and as discussed, supply conduit 162 may include SMA lifting tube 250 and return conduit 164 may include and/or be a flexible tube. In other examples, and as shown in dashed lines in FIGS. 15-16, supply conduit 162 and return conduit 164 each may include SMA lifting tube 250. In such examples, SMA lifting tube 250 of supply conduit 162 and SMA lifting tube 250 of return conduit 164 may be described as operating as antagonistic SMA actuators 210.

Figure 17:
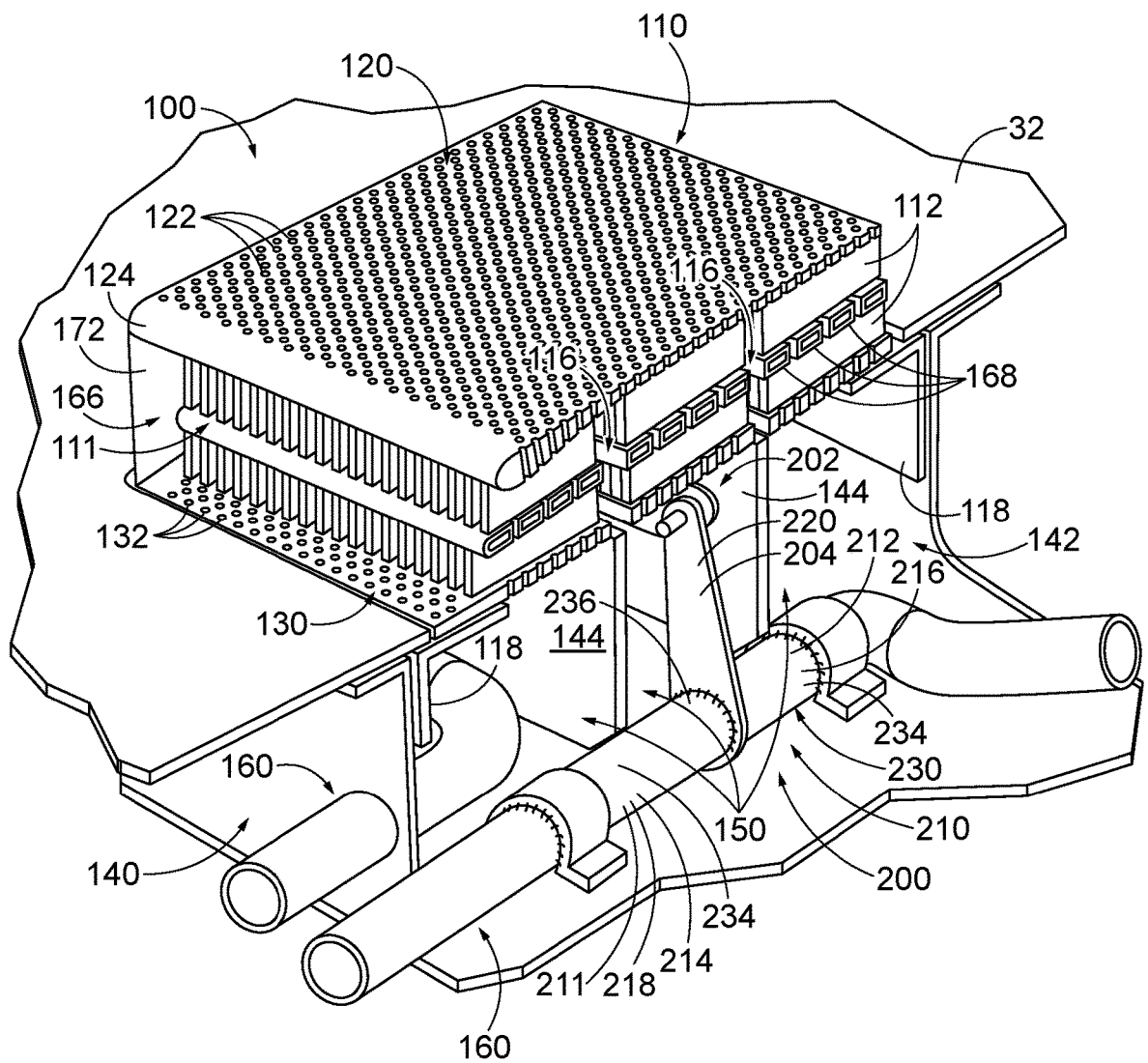
FIG. 17 is a cross-sectional fragmentary top side perspective view illustrating an example of a thermal management system, according to the present disclosure.

FIG. 17 is a less schematic illustration of an example of thermal management system 100 installed relative to structural surface 32. Specifically, FIG. 17 illustrates thermal management system 100 with actuator assembly 200 in the deployed position. In the example of FIG. 17, actuator assembly 200 includes SMA actuator 210 in the form of SMA torque tube 230 with a pair of static portions 234 fixedly coupled to housing 140 and active portion 236 positioned between static portions 234. Actuator assembly 200 further includes linkage mechanism 202 that includes actuator arm 204 in the form of actuation element 220 fixedly coupled to SMA torque tube 230 and slidingly coupled to heat exchanger 110 via a guide slot (only a portion of which is visible in FIG. 17). Additional elements shown and labeled in FIG. 17 are to be understood with reference to corresponding portions of the above discussion.

Figure 18:
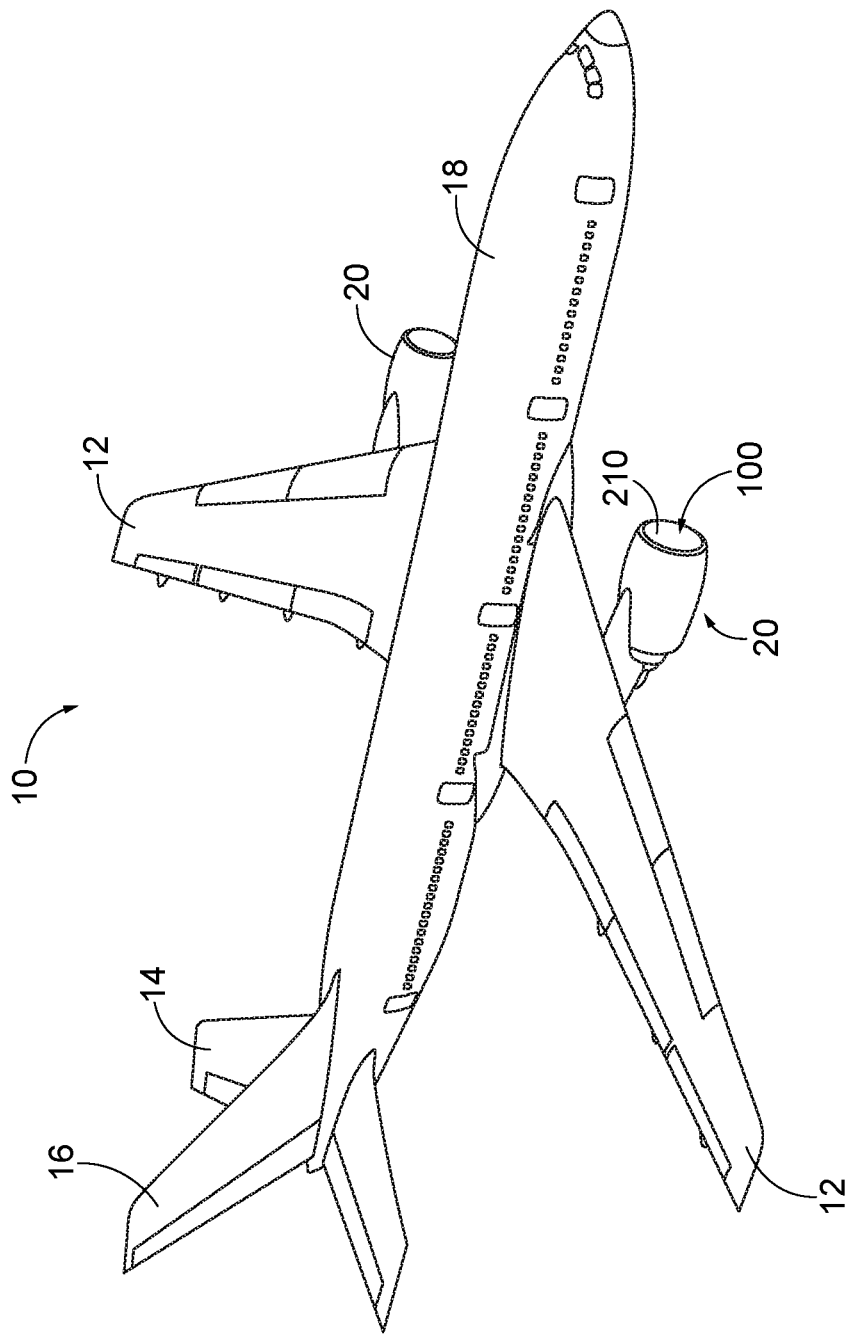
FIG. 18 is an illustration of an aircraft that may include and/or utilize thermal management systems, SMA actuators, and/or methods, according to the present disclosure

FIG. 18 is an illustration of an aircraft 10 that may include and/or utilize thermal management systems 100, SMA actuators 210, and/or methods 300, according to the present disclosure. As shown in FIG. 18, aircraft 10 may include one or more wings 12, a horizontal stabilizer 14, a vertical stabilizer 16, an airframe 18, and/or one or more turbofan engines 20. Examples of aircraft 10 include an airplane, a commercial aircraft, a passenger aircraft, and/or a military aircraft. Aircraft 10 may include and/or utilize thermal management systems 100 and/or SMA actuators 210 according to the present disclosure. As examples, thermal management system 100 and/or SMA actuators 210 according to the present disclosure may be incorporated into and/or utilized by turbofan engine(s) 20 and/or by any other appropriate component of aircraft 10, such as liquid-cooled electronics systems and/or an auxiliary power unit (APU).

Figure 19:
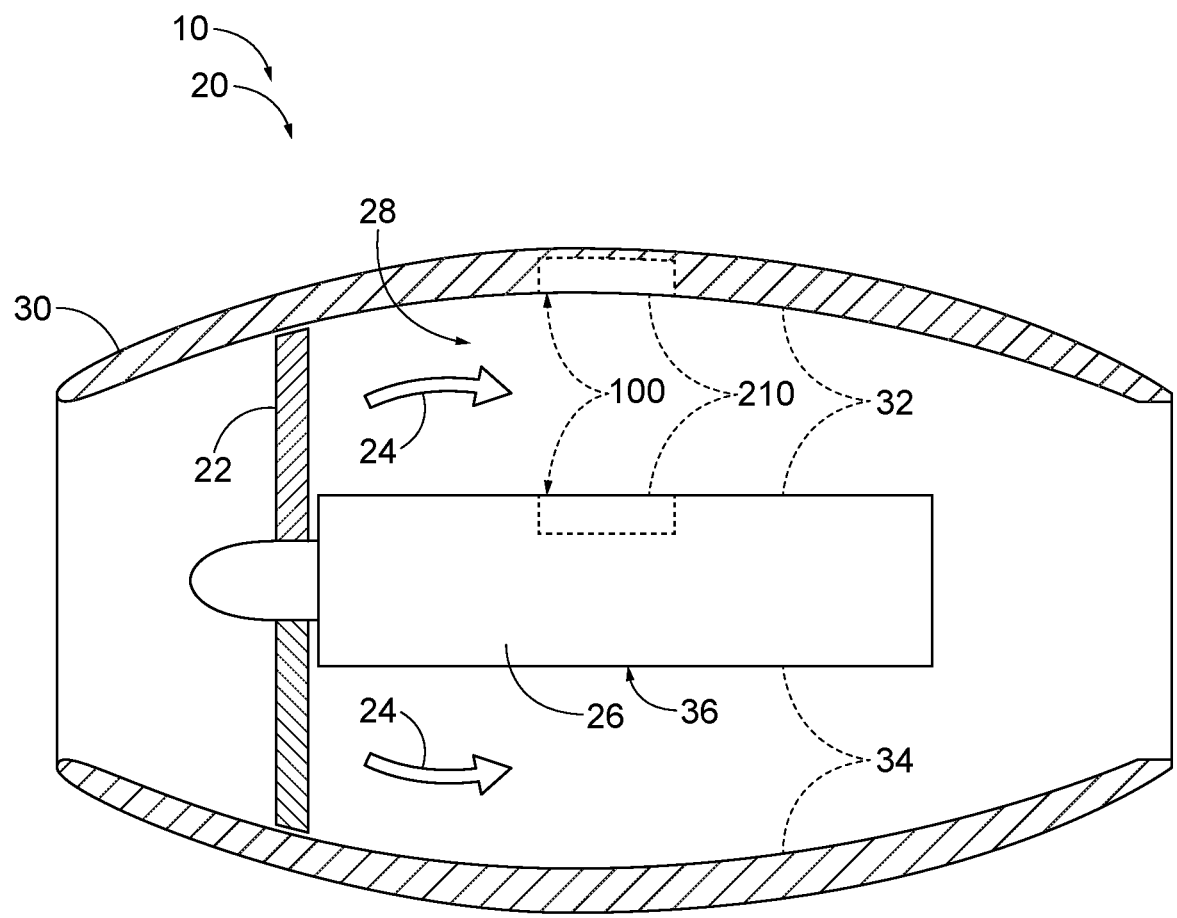
FIG. 19 is a partial cross-sectional schematic illustration of a turbofan engine that may include and/or utilize thermal management systems, SMA actuators, and/or methods, according to the present disclosure.

FIG. 19 is a schematic cross-sectional illustration of turbofan engine 20, such as may be utilized by aircraft 10 and/or such as may include and/or utilize thermal management system 100 and/or SMA actuators 210 according to the present disclosure. As schematically illustrated in FIG. 19, turbofan engine 20 may include a fan 22 configured to generate an air flow 24 to produce a thrust, an engine core 26 configured to generate a torque to power fan 22, and an engine core cowl 36 that at least substantially covers engine core 26. Turbofan engine 20 further may include a nacelle 30 that at least substantially encloses fan 22 and engine core 26, as well as a bypass duct 28 defined between engine core cowl 36 and nacelle 30 such that air flow 24 flows within bypass duct 28. As schematically illustrated in FIG. 19, turbofan engine 20 additionally may include thermal management system 100, such as may include and/or utilize SMA actuator 210, as described herein. In such examples, air flow 24 may include and/or be thermal management fluid flow 62. Additionally or alternatively, in such examples, process fluid 50 may include and/or be any appropriate process fluid utilized by turbofan engine 20, examples of which include an engine oil that is utilized by engine core 26 and a lubricating and/or cooling oil that is utilized by an engine accessory such as a generator.

In an example of turbofan engine 20 that includes thermal management system 100, thermal management system 100 may be supported by and/or a component of any appropriate portion of turbofan engine 20. As examples, and as schematically illustrated in FIG. 19, thermal management system 100 may be operatively coupled to and/or incorporated into engine core cowl 36 and/or nacelle 30. In such examples, thermal management system 100 may be installed adjacent to structural surface 32 of engine core cowl 36 and/or of nacelle 30, for example such that external surface 120 of heat exchanger 110 is at least substantially continuous and/or coplanar with structural surface 32 when actuator assembly 200 is in the stowed position, such as is illustrated in FIGS. 1, 5, 11, 13, and 15. In such examples, and as further schematically illustrated in FIG. 19, structural surface 32 may include and/or be acoustic liner 34 configured to attenuate an acoustic noise propagating through air flow 24 through bypass duct 28.

As discussed, utilizing thermal management system 100 in conjunction with turbofan engine 20 may be beneficial since heat exchanger 110 extends into thermal management fluid flow 62 only when actuator assembly 200 is in the deployed position, thereby minimizing the aerodynamic drag produced by heat exchanger 110. Moreover, and as discussed, utilizing heat exchanger 110 adjacent to acoustic liner 34 of turbofan engine 20 may enable thermal management system 100 to exhibit acoustic noise attenuation properties when actuator assembly 200 is in either of the stowed position or the deployed position and/or in any of the plurality of intermediate positions defined between the stowed position and the deployed position.

Figure 20:
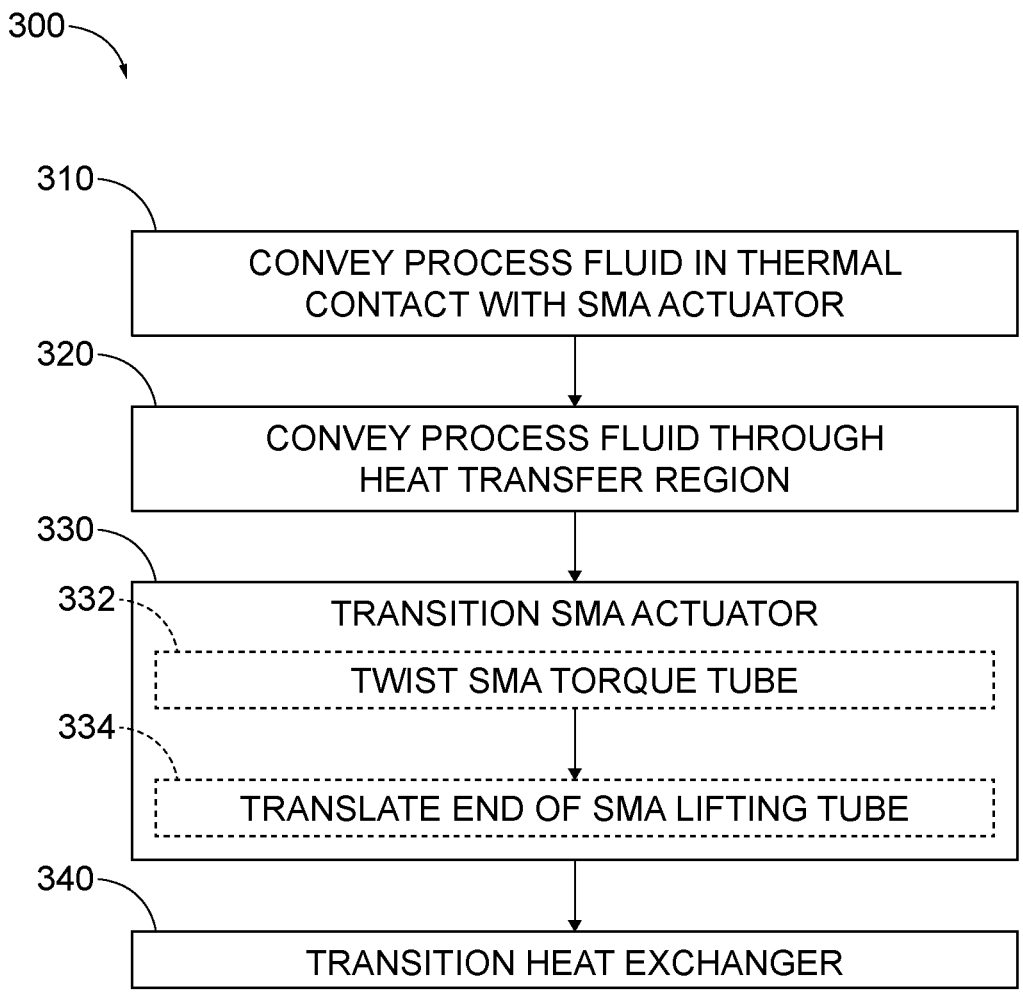
FIG. 20 is a flowchart depicting methods of utilizing thermal management systems according to the present disclosure.

FIG. 20 is a flowchart depicting methods 300, according to the present disclosure, of utilizing a thermal management system (such as thermal management system 100) to passively regulate a temperature of a process fluid (such as process fluid 50) with a thermal management fluid (such as thermal management fluid 60). As shown in FIG. 20, a method 300 includes conveying, at 310, the process fluid through a process fluid conduit (such as process fluid conduit 160) of the thermal management system such that the process fluid is in thermal contact with an SMA actuator (such as SMA actuator 210), and conveying, at 320, the process fluid through the process fluid conduit such that the process fluid flows through a heat transfer region (such as heat transfer region 111) of the heat exchanger. Method 300 additionally includes transitioning, at 330, the SMA actuator to assume a conformation among a plurality of conformations defined between and including a first conformation (such as the first conformation of SMA actuator 210) and a second conformation (such as the second conformation of SMA actuator 210) based upon a temperature of the process fluid that is in contact with the SMA actuator, and transitioning, at 340, the heat exchanger to assume a position among a plurality of positions defined between and including a stowed position (such as the stowed position of heat exchanger 110) and a deployed position (such as the deployed position of heat exchanger 110) based upon the conformation of the SMA actuator. In accordance with methods 300 according to the present disclosure, when the heat exchanger is in the deployed position, the heat transfer region extends within a thermal management fluid flow (such as thermal management fluid flow 62) of the thermal management fluid such that the process fluid is in heat exchange relation with the thermal management fluid, thereby enabling the thermal management fluid to regulate the temperature of the process fluid.

The conveying the process fluid in thermal contact with the SMA actuator at 310 and the conveying the process fluid through the heat transfer region at 320 may be performed in any appropriate order and/or manner. For example, the conveying at 310 may be performed prior to the conveying at 320, may be performed subsequent to the conveying at 320, and/or may be performed at least partially concurrent with the conveying at 320.

The transitioning the SMA actuator among the plurality of conformations at 330 may include distorting and/or manipulating the SMA actuator and/or a portion thereof in any appropriate manner. For example, and as shown in FIG. 20, the SMA actuator may include and/or be an SMA torque tube (such as SMA torque tube 230), and the transitioning at 330 may include twisting, at 332, the SMA torque tube about a longitudinal axis (such as longitudinal axis 232). In such examples, the twisting at 332 additionally may include rotating an actuation element (such as actuation element 220) that is coupled to the SMA torque tube about the longitudinal axis. More specifically, the twisting at 332 may include rotating the actuation element about the longitudinal axis in a first direction (such as first direction 222) responsive to the SMA actuator transitioning from the first conformation toward the second conformation, and may include rotating the actuation element about the longitudinal axis in a second direction (such as second direction 224) that is opposite the first direction responsive to the SMA actuator transitioning from the second conformation toward the first conformation.

In other examples, and as further shown in FIG. 20, the SMA actuator may include and/or be an SMA lifting tube (such as SMA lifting tube 250), and the transitioning at 330 may include translating, at 334, a first end (such as first end 212) of the SMA lifting tube relative to a second end (such as second end 214) of the SMA lifting tube at least partially along a lateral direction (such as lateral direction 226) that is at least substantially perpendicular to at least a portion of the SMA lifting tube between the first end and the second end.

Illustrative, non-exclusive examples of inventive subject matter according to the present disclosure are described in the following enumerated paragraphs:

A1. A shape memory alloy (SMA) actuator (210), comprising:

an SMA lifting tube (250) that includes and extends between a first end (212) and a second end (214) and that is configured to be in thermal communication with a process fluid (50) during operative use of the SMA actuator (210);

wherein the SMA actuator (210) is configured to assume a conformation among a plurality of conformations defined between and including a first conformation and a second conformation; wherein the conformation of the SMA actuator (210) is based, at least in part, on the temperature of the process fluid (50) that is in thermal communication with the SMA lifting tube (250) during operative use of the SMA actuator (210); and wherein the SMA lifting tube (250) is configured such that the second end (214) translates relative to the first end (212) at least partially along a lateral direction (226) that is at least substantially perpendicular to at least a portion of the SMA lifting tube (250) between the first end (212) and the second end (214) as the SMA actuator (210) transitions between the first conformation and the second conformation.

A2. The SMA actuator (210) of paragraph A1, wherein the lateral direction (226) is at least substantially perpendicular to a direction of a process fluid flow (52) of the process fluid (50) within at least a portion of the SMA lifting tube (250).

A3. The SMA actuator (210) of any of paragraphs A1-A2, wherein the SMA lifting tube (250) extends along a path that is one or more of helical, cylindrical, S-shaped, U-shaped, or coil-shaped.

A4. The SMA actuator (210) of any of paragraphs A1-A3, wherein the SMA lifting tube (250) includes an SMA coil (252) that extends at least substantially within a coil plane (254) when the SMA actuator (210) is in one of the first conformation and the second conformation, and wherein the lateral direction (226) is at least substantially perpendicular to the coil plane (254).

A5. The SMA actuator (210) of paragraph A4, wherein the SMA coil (252) deforms along the lateral direction (226) to transition the SMA actuator (210) between the first conformation and the second conformation.

A6. The SMA actuator (210) of any of paragraphs A1-A5, wherein the SMA lifting tube (250) is a hollow SMA lifting tube (250).

A7. The SMA actuator (210) of any of paragraphs A1-A6, wherein the first end (212) is an upstream end (216) of the SMA lifting tube (250), wherein the second end (214) is a downstream end (218) of the SMA lifting tube (250), and wherein the SMA actuator (210) is configured such that the process fluid (50) flows through the SMA lifting tube (250) from the upstream end (216) to the downstream end (218) during operative use of the SMA actuator (210).

A8. The SMA actuator (210) of any of paragraphs A1-A7, wherein the SMA actuator (210) is at least substantially formed of an SMA material (211) that includes one or more of a binary alloy; a nickel-titanium alloy; a binary nickel-titanium alloy; a ternary alloy; a ternary alloy that includes nickel and titanium; a ternary nickel-titanium-palladium alloy; a ternary manganese-nickel-cobalt alloy; a quaternary alloy; a quaternary alloy that includes nickel and titanium; or an alloy that includes at least one of nickel, titanium, palladium, manganese, hafnium, copper, iron, silver, cobalt, chromium, and vanadium.

A9. The SMA actuator (210) of paragraph A8, wherein the SMA material (211) is configured to transition from a martensite state to an austenite state responsive to the temperature of the SMA material (211) increasing, and wherein the SMA material (211) is configured to transition from the austenite state to the martensite state responsive to the temperature of the SMA material (211) decreasing.

A10. The SMA actuator (210) of paragraph A9, wherein the SMA material (211) is configured to begin a transition from the martensite state to the austenite state when the SMA material (211) reaches an initial heating temperature from below; wherein the SMA material (211) is configured to complete the transition from the martensite state to the austenite state when the SMA material (211) reaches a final heating temperature that is greater than the initial heating temperature; wherein the SMA material (211) is configured to begin a transition from the austenite state to the martensite state when the SMA material (211) reaches an initial cooling temperature from above; and wherein the SMA material (211) is configured to complete the transition from the austenite state to the martensite state when the SMA material (211) reaches a final cooling temperature that is less than the initial cooling temperature.

A11. The SMA actuator (210) of paragraph A10, wherein the initial heating temperature is greater than the final cooling temperature, and wherein the final heating temperature is greater than the initial cooling temperature.

A12. The SMA actuator (210) of any of paragraphs A10-A11, wherein the SMA material (211) is configured to remain in the austenite state when the temperature of the SMA material (211) is greater than the final heating temperature, and wherein the SMA material (211) is configured to remain in the martensite state when the temperature of the SMA material (211) is less than the final cooling temperature.

A13. The SMA actuator (210) of any of paragraphs A9-A12, wherein the SMA actuator (210) is in the first conformation when the SMA material (211) is in one of the martensite state and the austenite state, and wherein the SMA actuator (210) is in the second conformation when the SMA material (211) is in the other of the martensite state and the austenite state.

A14. The SMA actuator (210) of any of paragraphs A1-A13, wherein the SMA lifting tube (250) is configured to perform work on a load as the SMA actuator (210) transitions between the first conformation and the second conformation.

A15. The SMA actuator (210) of paragraph A14, wherein the first end (212) is configured to be operatively coupled to a first component, wherein the second end (214) is configured to be operatively coupled to a second component, and wherein the SMA actuator (210) is configured to translate the first component and the second component relative to one another at least partially along the lateral direction (226) as the SMA actuator (210) transitions between the first conformation and the second conformation.

A16. The SMA actuator (210) of paragraph A15, wherein the SMA actuator (210) is configured to exert a force to push the first component and the second component away from one another.

A17. The SMA actuator (210) of any of paragraphs A5-A16, wherein the SMA actuator (210) is configured to exert a force to pull the first component and the second component toward one another.

A18. The SMA actuator (210) of any of paragraphs A1-A17, wherein the first end (212) and the second end (214) are at least substantially maintained in a fixed rotational orientation relative to one another as the SMA actuator (210) transitions between the first conformation and the second conformation.

A19. The SMA actuator (210) of any of paragraphs A1-A18, when dependent from paragraph A8, wherein the SMA actuator (210) is configured to restrict the second end (214) from translating relative to the first end (212) along the lateral direction (226) when the SMA material (211) is in a substantially constant state defined between and including a/the martensite state and a/the austenite state.

A20. The SMA actuator (210) of any of paragraphs A1-A19, when dependent from paragraph A8, wherein the SMA actuator (210) is configured to maintain the first end (212) and the second end (214) at a substantially constant separation distance (260), as measured along a direction parallel to the lateral direction (226), when the process fluid (50) that flows in thermal communication with the SMA lifting tube (250) maintains the SMA material (211) at a substantially constant temperature during operative use of the SMA actuator (210).

A21. The SMA actuator (210) of any of paragraphs A1-A20, wherein the SMA lifting tube (250) is at least substantially rigid at least when the SMA actuator (210) is not actively transitioning between the first conformation and the second conformation.

A22. The SMA actuator (210) of any of paragraphs A1-A21, wherein the SMA lifting tube (250) is configured such that the first end (212) travels relative to the second end (214) at least partially along a transverse direction (228) that is perpendicular to the lateral direction (226) as the SMA actuator (210) transitions between the first conformation and the second conformation.

B1. A thermal management system (100) configured to regulate a temperature of a process fluid (50) via thermal exchange between the process fluid (50) and a thermal management fluid (60) during operative use of the thermal management system (100), the thermal management system (100) comprising:

a heat exchanger (110) that at least partially defines a heat transfer region (111) configured such that the thermal exchange between the process fluid (50) and the thermal management fluid (60) occurs within the heat transfer region (111) during operative use of the thermal management system (100);

a housing (140) that selectively and operatively receives the heat exchanger (110);

a process fluid conduit (160) configured to convey a process fluid flow (52) of the process fluid (50) through the heat transfer region (111) during operative use of the thermal management system (100), wherein the process fluid conduit (160) includes a heat transfer portion (166) that extends within the heat transfer region (111); and an actuator assembly (200) configured to selectively position the heat exchanger (110) relative to the housing (140), wherein the actuator assembly (200) is configured to selectively assume a position among a plurality of positions that include a stowed position, in which the heat exchanger (110) is at least substantially received within the housing (140), and a deployed position, in which the heat exchanger (110) extends from the housing (140);

wherein the thermal management system (100) is configured such that, when the actuator assembly (200) is in the deployed position during operative use of the thermal management system (100), the heat transfer region (111) extends within a thermal management fluid flow (62) of the thermal management fluid (60) such that the heat transfer portion (166) is in thermal contact with each of the process fluid flow (52) and the thermal management fluid flow (62) and such that the process fluid flow (52) flows in heat exchange relation with the thermal management fluid flow (62).

B1.1. The thermal management system (100) of paragraph B1, wherein the actuator assembly (200) further is configured to selectively assume one or more intermediate positions defined between the stowed position and the deployed position, wherein the thermal management system (100) is configured to bring the process fluid (50) into thermal communication with the thermal management fluid (60) within the heat transfer region (111) to change the temperature of the process fluid (50) when the actuator assembly (200) is in each of the one or more intermediate positions during operative use of the thermal management system (100).

B2. The thermal management system (100) of any of paragraphs B1-B1.1, wherein the process fluid conduit (160) further includes a supply conduit (162) and a return conduit (164); wherein each of the supply conduit (162) and the return conduit (164) is operatively coupled to the heat exchanger (110) and fluidly coupled to the heat transfer portion (166); wherein the process fluid conduit (160) is configured such that the process fluid flow (52) flows through the supply conduit (162) prior to flowing through the heat transfer portion (166) and such that the process fluid flow (52) flows through the return conduit (164) subsequent to flowing through the heat transfer portion (166) during operative use of the thermal management system (100).

B3. The thermal management system (100) of paragraph B2, wherein one or both of the supply conduit (162) and the return conduit (164) includes and/or is a flexible tube configured to passively deform as the actuator assembly (200) transitions between the stowed position and the deployed position.

B4. The thermal management system (100) of any of paragraphs B2-B3, wherein one of the supply conduit (162) and the return conduit (164) is configured to remain at least substantially stationary as the actuator assembly (200) transitions between the stowed position and the deployed position.

B5. The thermal management system (100) of any of paragraphs B1-B4, wherein the heat exchanger (110) is configured to pivot relative to the housing (140) about a pivot axis (102) as the actuator assembly (200) transitions between the stowed position and the deployed position.

B6. The thermal management system (100) of paragraph B5, wherein the pivot axis (102) is at least substantially parallel to the thermal management fluid flow (62) during operative use of the thermal management system (100).

B7. The thermal management system (100) of paragraph B5, wherein the pivot axis (102) is at least substantially perpendicular to the thermal management fluid flow (62) during operative use of the thermal management system (100).

B8. The thermal management system (100) of any of paragraphs B1-B7, wherein the thermal management system (100) is configured for operative use in which the process fluid (50) includes one or more of a liquid, water, a coolant, propylene glycol, ethylene glycol, a lubricant, or an oil.

B9. The thermal management system (100) of any of paragraphs B1-B8, wherein the thermal management system (100) is configured for operative use in which the thermal management fluid (60) includes one or more of a gas, air, a liquid, water, or an organic compound.

B10. The thermal management system (100) of any of paragraphs B1-B9, wherein the thermal management system (100) is configured to bring the process fluid (50) into thermal communication with the thermal management fluid (60) within the heat transfer region (111) to change the temperature of the process fluid (50) during operative use of the thermal management system (100).

B11. The thermal management system (100) of paragraph 1310, wherein the thermal management system (100) is configured to decrease the temperature of the process fluid (50) during operative use of the thermal management system (100).

B12. The thermal management system of paragraph B11, wherein the thermal management system (100) is configured such that the actuator assembly (200) automatically transitions from the stowed position toward the deployed position when the temperature of the process fluid (50) rises above a predetermined lower threshold temperature during operative use of the thermal management system (100).

B13. The thermal management system (100) of any of paragraphs B11-B12, wherein the thermal management system (100) is configured such that the actuator assembly (200) automatically transitions from the deployed position toward the stowed position when the temperature of the process fluid (50) falls below a predetermined upper threshold temperature during operative use of the thermal management system (100).

B14. The thermal management system (100) of any of paragraphs 1310-1313, wherein the thermal management system (100) is configured to increase the temperature of the process fluid (50) during operative use of the thermal management system (100).

B15. The thermal management system (100) of paragraph B14, wherein the thermal management system (100) is configured such that the actuator assembly (200) transitions from the stowed position toward the deployed position when the temperature of the process fluid (50) falls below a predetermined upper threshold temperature during operative use of the thermal management system (100).

B16. The thermal management system (100) of any of paragraphs B14-B15, wherein the thermal management system (100) is configured such that the actuator assembly (200) automatically transitions from the deployed position toward the stowed position when the temperature of the process fluid (50) rises above a predetermined lower threshold temperature during operative use of the thermal management system (100).

B17. The thermal management system (100) of any of paragraphs B1-B16, wherein the thermal management system (100) is configured such that the actuator assembly (200) assumes the stowed position when the temperature of the process fluid (50) is within a nominal temperature range during operative use of the thermal management system (100).

B18. The thermal management system (100) of any of paragraphs B1-B17, wherein the thermal management system (100) is configured such that the actuator assembly (200) assumes an/the intermediate position that is defined between the stowed position and the deployed position when the temperature of the process fluid (50) is greater than a/the predetermined lower threshold temperature and less than a/the predetermined upper threshold temperature.

B19. The thermal management system (100) of any of paragraphs B1-B18, wherein the heat exchanger (110) further includes one or more heat spreaders (112) in thermal communication with the heat transfer portion (166) and configured to enhance the thermal communication between the thermal management fluid (60) and the process fluid (50) that flows within the heat transfer portion (166) during operative use of the thermal management system (100).

B20. The thermal management system (100) of paragraph B19, wherein the heat spreader (112) includes one or more of a heat sink, a fin, or a plate.

B21. The thermal management system (100) of any of paragraphs B19-B20, wherein the heat spreader (112) is configured to permit the thermal management fluid (60) to flow therethrough during operative use of the thermal management system (100).

B22. The thermal management system (100) of any of paragraphs B19-B21, wherein the heat spreader (112) defines a plurality of heat spreader passages (114) configured to permit sound waves to traverse the heat spreader (112).

B23. The thermal management system (100) of any of paragraphs B1-B22, wherein the heat transfer portion (166) includes a plurality of heat transfer passages (168) extending within the heat transfer region (111), and wherein the process fluid conduit (160) further includes a supply manifold (172) and a return manifold (174) configured such that, during operative use of the thermal management system (100), the process fluid flow (52) flows sequentially from the supply manifold (172) through one or more of the plurality of heat transfer passages (168) and to the return manifold (174).

B24. The thermal management system (100) of paragraph B23, wherein the heat transfer region (111) has a heat transfer region area, as measured within a plane that extends parallel to the thermal management fluid flow (62), and wherein the plurality of heat transfer passages (168) collectively occupy a passage cross-sectional area, as measured in the plane that extends parallel to the thermal management fluid flow (62), that is one or more of at least 10%, at least 15%, at least 20%, at least 30%, at least 40%, at least 50%, at most 90%, at most 75%, at most 45%, at most 35%, at most 25%, at most 17%, or at most 12% of the heat transfer region area.

B25. The thermal management system (100) of any of paragraphs B23-B24, wherein each of the supply manifold (172) and the return manifold (174) is statically coupled to the heat exchanger (110).

B26. The thermal management system (100) of any of paragraphs B1-B25, wherein the thermal management system (100) is configured such that, during operative use of the thermal management system (100), the process fluid flow (52) flows through the heat transfer portion (166) when the actuator assembly (200) is in any of the plurality of positions defined between and including the stowed position and the deployed position.

B27. The thermal management system (100) of any of paragraphs B1-B26, wherein one or both of the heat exchanger (110) and the housing (140) further includes one or more sliding guides (118) configured to at least partially maintain an alignment of the heat exchanger (110) relative to the housing (140) as the heat exchanger (110) translates relative to the housing (140).

B28. The thermal management system (100) of paragraph B27, wherein each sliding guide (118) includes a low friction material.

B29. The thermal management system (100) of any of paragraphs B1-B28, wherein the actuator assembly (200) includes a shape memory alloy (SMA) actuator (210) configured to assume a conformation among a plurality of conformations defined between and including a first conformation and a second conformation, wherein the SMA actuator (210) is configured to be in thermal contact with the process fluid (50) during operative use of the thermal management system (100), wherein, during operative use of the thermal management system (100), the conformation of the SMA actuator (210) is based, at least in part, on the temperature of the process fluid (50) that is in thermal contact with the SMA actuator (210), and wherein the position of the actuator assembly (200) is based, at least in part, on the conformation of the SMA actuator (210).

B30. The thermal management system (100) of paragraph B29, wherein the actuator assembly (200) is in the stowed position when the SMA actuator (210) is in the first conformation, wherein the actuator assembly (200) is in the deployed position when the SMA actuator (210) is in the second conformation, and wherein the actuator assembly (200) is in a/the intermediate position when the SMA actuator (210) is in an intermediate conformation defined between the first conformation and the second conformation.

B31. The thermal management system (100) of any of paragraphs B29-B30, wherein the SMA actuator (210) is at least substantially formed of an SMA material (211).

B32. The thermal management system (100) of paragraph B31, wherein the SMA material (211) includes and/or is one or more of a binary alloy; a nickel-titanium alloy; a binary nickel-titanium alloy; a ternary alloy; a ternary alloy that includes nickel and titanium; a ternary nickel-titanium-palladium alloy; a ternary manganese-nickel-cobalt alloy; a quaternary alloy; a quaternary alloy that includes nickel and titanium; or an alloy that includes at least one of nickel, titanium, palladium, manganese, hafnium, copper, iron, silver, cobalt, chromium, and vanadium.

B33. The thermal management system (100) of paragraph B32, wherein the SMA material (211) is configured to transition from a martensite state to an austenite state responsive to the temperature of the SMA material (211) increasing, and wherein the SMA material (211) is configured to transition from the austenite state to the martensite state responsive to the temperature of the SMA material (211) decreasing.

B34. The thermal management system (100) of paragraph B33, wherein the SMA material (211) is configured to begin a transition from the martensite state to the austenite state when the SMA material (211) reaches an initial heating temperature from below; wherein the SMA material (211) is configured to complete the transition from the martensite state to the austenite state when the SMA material (211) reaches a final heating temperature that is greater than the initial heating temperature; wherein the SMA material (211) is configured to begin a transition from the austenite state to the martensite state when the SMA material (211) reaches an initial cooling temperature from above; and wherein the SMA material (211) is configured to complete the transition from the austenite state to the martensite state when the SMA material (211) reaches a final cooling temperature that is less than the initial cooling temperature.

B35. The thermal management system (100) of paragraph B34, wherein the initial heating temperature is greater than the final cooling temperature.

B36. The thermal management system (100) of paragraph B34, wherein the final heating temperature is greater than the initial cooling temperature.

B37. The thermal management system (100) of any of paragraphs B34-B36, wherein the SMA material (211) is configured to remain in the austenite state when the temperature of the SMA material (211) is greater than the final heating temperature.

B38. The thermal management system (100) of any of paragraphs B34-B37, wherein the SMA material (211) is configured to remain in the martensite state when the temperature of the SMA material (211) is less than the final cooling temperature.

B39. The thermal management system (100) of any of paragraphs B33-B38, wherein the SMA actuator (210) is in the first conformation when the SMA material (211) is in one of the martensite state and the austenite state, and wherein the SMA actuator (210) is in the second conformation when the SMA material (211) is in the other of the martensite state and the austenite state.

B40. The thermal management system (100) of any of paragraphs B29-B39, wherein the process fluid conduit (160) includes the SMA actuator (210).

B41. The thermal management system (100) of paragraph B40, wherein the process fluid conduit (160) is configured such that the process fluid flow (52) flows through the SMA actuator (210) from an upstream end (216) of the SMA actuator (210) to a downstream end (218) of the SMA actuator (210) during operative use of the thermal management system (100).

B42. The thermal management system (100) of paragraph B41, wherein the process fluid conduit (160) is configured such that the process fluid (50) flows through the heat transfer portion (166) subsequent to flowing through the SMA actuator (210) during operative use of the thermal management system (100).

B43. The thermal management system (100) of any of paragraphs B41-B42, wherein the thermal management system (100) is configured to change the temperature of the process fluid (50) subsequent to the process fluid (50) flowing through the SMA actuator (210) during operative use of the thermal management system (100).

B44. The thermal management system (100) of any of paragraphs B41-B43, wherein the process fluid conduit (160) is configured such that the process fluid (50) flows through the heat transfer portion (166) prior to flowing through the SMA actuator (210) during operative use of the thermal management system (100).

B45. The thermal management system (100) of any of paragraphs B41-B44, wherein the thermal management system (100) is configured to change the temperature of the process fluid (50) prior to the process fluid (50) flowing through the SMA actuator (210) during operative use of the thermal management system (100).

B46. The thermal management system (100) of any of paragraphs B41-B45, wherein the process fluid conduit (160) is configured such that the process fluid (50) flows through the heat transfer portion (166) at least partially concurrent with flowing through the SMA actuator (210) during operative use of the thermal management system (100).

B47. The thermal management system (100) of any of paragraphs B41-B46, wherein the thermal management system (100) is configured to change the temperature of the process fluid (50) at least partially concurrent with the process fluid (50) flowing through the SMA actuator (210) during operative use of the thermal management system (100).

B48. The thermal management system (100) of any of paragraphs B29-B47, wherein the SMA actuator (210) includes an SMA torque tube (230).

B49. The thermal management system (100) of paragraph B48, wherein the SMA torque tube (230) is one or both of tubular and cylindrical.

B50. The thermal management system (100) of any of paragraphs B48-B49, wherein the SMA torque tube (230) has a longitudinal axis (232), and wherein the SMA torque tube (230) is configured to twist about the longitudinal axis (232) as the SMA actuator (210) transitions between the first conformation and the second conformation.

B51. The thermal management system (100) of paragraph B50, wherein the SMA torque tube (230) twisting about the longitudinal axis (232) operates to transition the actuator assembly (200) between the stowed position and the deployed position.

B52. The thermal management system (100) of any of paragraphs B48-B51, wherein the SMA torque tube (230) includes a static portion (234) that is fixedly coupled to one of the housing (140) or the heat exchanger (110) and an active portion (236) configured to twist relative to the static portion (234).

B53. The thermal management system (100) of paragraph B52, wherein the actuator assembly (200) further includes an actuation element (220) that is fixedly coupled to the active portion (236) and that extends away from the SMA torque tube (230).

B54. The thermal management system (100) of paragraph B53, wherein the actuation element (220) is configured to rotate relative to a/the longitudinal axis (232) of the SMA torque tube (230) in a first direction (222) as the SMA actuator (210) transitions from the first conformation toward the second conformation, and wherein the actuation element (220) is configured to rotate relative to the longitudinal axis (232) of the SMA torque tube (230) in a second direction (224) that is opposite the first direction (222) as the SMA actuator (210) transitions from the second conformation toward the first conformation.

B55. The thermal management system (100) of any of paragraphs B52-B54, wherein the actuator assembly (200) further includes a linkage mechanism (202) configured to convert twisting motion of the active portion (236) into a force to transition the actuator assembly (200) between the stowed position and the deployed position and to one or both of:

(i) translate the heat exchanger (110) relative to the housing (140); and (ii) rotate the heat exchanger (110) relative to the housing (140).

B56. The thermal management system (100) of paragraph B55, wherein the linkage mechanism (202) includes a/the actuation element (220).

B57. The thermal management system (100) of any of paragraphs B55-B56, wherein at least a portion of the linkage mechanism (202) is fixedly coupled to the active portion (236).

B58. The thermal management system (100) of any of paragraphs B55-B57, wherein the static portion (234) is fixedly coupled to the housing (140), and wherein at least a portion of the linkage mechanism (202) is fixedly coupled to the heat exchanger (110).

B59. The thermal management system (100) of any of paragraphs B55-B58, wherein the static portion (234) is fixedly coupled to the heat exchanger (110), and wherein at least a portion of the linkage mechanism (202) is fixedly coupled to the housing (140).

B60. The thermal management system (100) of any of paragraphs B55-B59, wherein the linkage mechanism (202) includes one or more actuator arms (204), wherein at least a portion of each actuator arm (204) is configured rotate with respect to one of the housing (140) and the heat exchanger (110), and wherein at least a portion of each actuator arm (204) is configured to translate with respect to the other of the housing (140) and the heat exchanger (110).

B61. The thermal management system (100) of paragraph B60, wherein at least one actuator arm (204) of the one or more actuator arms (204) is fixedly coupled to the active portion (236).

B62. The thermal management system (100) of any of paragraphs B48-B61, wherein the SMA torque tube (230) is supported by the heat exchanger (110) such that at least a portion of the SMA torque tube (230) extends within the heat transfer region (111).

B63. The thermal management system (100) of any of paragraphs B29-B62, wherein the SMA actuator (210) includes the SMA lifting tube (250) of any of paragraphs A1-A22.

B64. The thermal management system (100) of paragraph B63, wherein each of the first end (212) and the second end (214) is at least substantially maintained in a fixed rotational orientation as the actuator assembly (200) transitions between the stowed position and the deployed position.

B65. The thermal management system (100) of any of paragraphs B29-B64, wherein one of the supply conduit (162) and the return conduit (164) includes and/or is the SMA actuator (210).

B66. The thermal management system (100) of paragraph B65, wherein the other of the supply conduit (162) and the return conduit (164) includes and/or is a/the flexible tube.

B67. The thermal management system (100) of any of paragraphs B29-B66, wherein the actuator assembly (200) transitions from the stowed position to the deployed position responsive to the SMA actuator (210) transitioning from the first conformation to the second conformation.

B68. The thermal management system (100) of any of paragraphs B29-B67, wherein the actuator assembly (200) transitions from the deployed position to the stowed position responsive to the SMA actuator (210) transitioning from the second conformation to the first conformation.

B69. The thermal management system (100) of any of paragraphs B1-B68, wherein at least a portion of the heat exchanger (110) is configured to operate as an acoustic liner (34) that attenuates an acoustic noise propagating through the thermal management fluid flow (62) when the actuator assembly (200) is in one or more of the stowed position, the deployed position, and an/the intermediate position defined between the stowed position and the deployed position and during operative use of the thermal management system (100).

B70. The thermal management system (100) of paragraph B69, wherein the heat exchanger (110) includes an external surface (120) and an internal surface (130) that extends at least substantially parallel to the external surface (120), and wherein the heat transfer region (111) extends between the external surface (120) and the internal surface (130).

B71. The thermal management system (100) of paragraph B70, wherein the heat exchanger (110) is configured to permit sound waves to propagate through the heat transfer region (111) from the external surface (120) to the internal surface (130).

B72. The thermal management system (100) of any of paragraphs B70-B71, wherein each of the external surface (120) and the internal surface (130) is at least substantially planar.

B73. The thermal management system (100) of any of paragraphs B70-B72, wherein the external surface (120) includes a shaped leading edge (124) configured to mitigate a drag force imparted on the heat exchanger (110) by the thermal management fluid flow (62) when the actuator assembly (200) is in the deployed position during operative use of the thermal management system (100).

B74. The thermal management system (100) of paragraph B73, wherein the shaped leading edge (124) further is configured to mitigate the drag force imparted on the heat exchanger (110) by the thermal management fluid flow (62) when the actuator assembly (200) is in the stowed position during operative use of the thermal management system (100).

B75. The thermal management system (100) of any of paragraphs B70-B74, wherein the external surface (120) defines a plurality of external perforations (122) configured to permit sound waves to traverse the external surface (120).

B76. The thermal management system (100) of paragraph B75, wherein the plurality of external perforations (122) collectively yield a porosity of the external surface (120) that is one or more of at least 1%, at least 3%, at least 5%, at least 10%, at least 15%, at least 20%, at least 30%, at least 40%, at least 50%, at most 55%, at most 45%, at most 35%, at most 25%, at most 17%, at most 12%, at most 7%, or at most 2%.

B77. The thermal management system (100) of any of paragraphs B70-B76, wherein the internal surface (130) defines a plurality of internal perforations (132) configured to permit sound waves to traverse the internal surface (130).

B78. The thermal management system (100) of paragraph B77, wherein the plurality of internal perforations (132) collectively yield a porosity of the internal surface (130) that is one or more of at least 1%, at least 3%, at least 5%, at least 10%, at least 15%, at least 20%, at least 30%, at least 40%, at least 50%, at most 55%, at most 45%, at most 35%, at most 25%, at most 17%, at most 12%, at most 7%, or at most 2%.

B79. The thermal management system (100) of any of paragraphs B75-B78, wherein the housing (140) defines a housing volume (142) such that the heat exchanger (110) is at least substantially received within the housing volume (142) when the actuator assembly (200) is in the stowed position, and wherein, during operative use of the thermal management system (100), the external surface (120) substantially restricts sound waves associated with the thermal management fluid flow (62) from entering the housing volume (142) other than via the plurality of external perforations (122) when the actuator assembly (200) is in the stowed position.

B80. The thermal management system (100) of any of paragraphs B77-B79, wherein the housing (140) defines a/the housing volume (142) such that the heat exchanger (110) is at least substantially received within the housing volume (142) when the actuator assembly (200) is in the stowed position, and wherein, during operative use of the thermal management system (100), the internal surface (130) substantially restricts sound waves associated with the thermal management fluid flow (62) from entering the housing volume (142) other than via the plurality of internal perforations (132) when the actuator assembly (200) is in the deployed position.

B81. The thermal management system (100) of any of paragraphs B70-B80, wherein, when the actuator assembly (200) is in the stowed position, the external surface (120), the internal surface (130), and the housing (140) collectively define one or more acoustic cavities (150) configured to attenuate the acoustic noise.

B82. The thermal management system (100) of any of paragraphs B70-B81, wherein, when the actuator assembly (200) is in the deployed position, the internal surface (130) and the housing (140) collectively define a/the one or more acoustic cavities (150) configured to attenuate the acoustic noise.

B83. The thermal management system (100) of any of paragraphs B81-B82, wherein the housing (140) includes one or more bulkheads (144) statically extending within a/the housing volume (142) of the housing (140) along a direction at least substantially perpendicular to the thermal management fluid flow (62), and wherein each bulkhead (144) of the one or more bulkheads (144) at least partially defines at least one of the one or more acoustic cavities (150).

B84. The thermal management system (100) of paragraph B83, wherein, when the actuator assembly (200) is in the stowed position, the heat exchanger (110) at least partially receives at least one of the one or more bulkheads (144).

B85. The thermal management system (100) of any of paragraphs B83-B84, wherein the heat exchanger (110) defines one or more slots (116), each slot (116) configured to at least partially receive a respective bulkhead (144) of the one or more bulkheads (144).

B86. The thermal management system (100) of any of paragraphs B81-B85, wherein each acoustic cavity (150) of the one or more acoustic cavities (150) has a cavity length (152), as measured along a direction parallel to the thermal management fluid flow (62), that is one or more of at least 1 centimeter (cm), at least 3 cm, at least 5 cm, at least 10 cm, at least 15 cm, at most 20 cm, at most 17 cm, at most 12 cm, at most 7 cm, or at most 2 cm.

B87. The thermal management system (100) of any of paragraphs B81-B86, wherein each acoustic cavity (150) of the one or more acoustic cavities (150) has a cavity depth (154), as measured along a direction perpendicular to a/the external surface (120), that is one or more of at least 1 cm, at least 3 cm, at least 5 cm, at least 10 cm, at least 15 cm, at most 20 cm, at most 17 cm, at most 12 cm, at most 7 cm, or at most 2 cm.

B88. The thermal management system (100) of any of paragraphs B81-B87, wherein each acoustic cavity (150) of the one or more acoustic cavities (150) is configured to operate as a Helmholtz resonator.

B89. The thermal management system (100) of any of paragraphs B81-B88, when dependent from paragraph B75, wherein, when the actuator assembly (200) is in the stowed position during operative use of the thermal management system (100), the external surface (120) substantially restricts sound waves associated with the thermal management fluid flow (62) from entering the one or more acoustic cavities (150) other than via the plurality of external perforations (122).

B90. The thermal management system (100) of any of paragraphs B81-B88, when dependent from paragraph B77, wherein, when the actuator assembly (200) is in one or both of the deployed position and an/the intermediate position defined between the stowed position and the deployed position during operative use of the thermal management system (100), the internal surface (130) substantially restricts sound waves associated with the thermal management fluid flow (62) from entering the one or more acoustic cavities (150) other than via the plurality of internal perforations (132).

C1. A turbofan engine (20), comprising:
a fan (22) configured to generate an air flow (24) to produce a thrust;
an engine core (26) configured to generate a torque to power the fan (22);
an engine core cowl (36) that at least substantially covers the engine core (26);
a nacelle (30) that at least substantially encloses the fan (22) and the engine core (26);
a bypass duct (28) defined between the engine core cowl (36) and the nacelle (30) such that the air flow (24) flows within the bypass duct (28); and
the thermal management system (100) of any of paragraphs B1-B90 operatively coupled to one of the engine core cowl (36) and the nacelle (30).

C2. The turbofan engine (20) of paragraph C1, wherein the air flow (24) includes and/or is the thermal management fluid flow (62).

C3. The turbofan engine (20) of any of paragraphs C1-C2, wherein the process fluid (50) is an engine oil utilized by the engine core (26).

C4. The turbofan engine (20) of any of paragraphs C1-C3, wherein the process fluid (50) is a lubricating oil utilized by an engine accessory, optionally a generator.

C5. The turbofan engine (20) of any of paragraphs C1-C4, wherein the thermal management system (100) is installed adjacent to a structural surface (32) of the one of the engine core (26) and the nacelle (30) such that a/the external surface (120) of the heat exchanger (110) is at least substantially coplanar with the structural surface (32) when the actuator assembly (200) is in the stowed position.

C6. The turbofan engine (20) of paragraph C5, wherein the structural surface (32) includes and/or is an/the acoustic liner (34) configured to attenuate an acoustic noise produce by the air flow (24) through the bypass duct (28).

C7. The use of the thermal management system (100) of any of paragraphs B1-B90 in the turbofan engine (20) of any of paragraphs C1-C6.

D1. An aircraft (10) comprising the turbofan engine (20) of any of paragraphs C1-C6.

D2. The use of the aircraft (10) of paragraph D1 to transport persons.

E1. A method (300) of utilizing a thermal management system (100) that includes a heat exchanger (110) to passively regulate a temperature of a process fluid (50) with a thermal management fluid (60), the method comprising:
conveying (310) the process fluid (50) through a process fluid conduit (160) of the thermal management system (100) such that the process fluid (50) is in thermal contact with a shape memory alloy (SMA) actuator (210);
conveying (320) the process fluid (50) through the process fluid conduit (160) such that the process fluid (50) flows through a heat transfer region (111) of the heat exchanger (110);
transitioning (330) the SMA actuator (210) to assume a conformation among a plurality of conformations defined between and including a first conformation and a second conformation based upon a temperature of the process fluid (50) that is in contact with the SMA actuator (210); and
transitioning (340) the heat exchanger (110) to assume a position among a plurality of positions defined between and including a stowed position and a deployed position based upon the conformation of the SMA actuator (210);
wherein, when the heat exchanger (110) is in the deployed position, the heat transfer region (111) extends within a thermal management fluid flow (62) of the thermal management fluid (60) such that the process fluid (50) is in heat exchange relation with the thermal management fluid (60).

E2. The method (300) of paragraph E1, wherein the conveying (310) the process fluid (50) in thermal contact with the SMA actuator (210) is performed prior to the conveying (320) the process fluid (50) through the heat transfer region (111).

E3. The method (300) of any of paragraphs E1-E2, wherein the conveying (310) the process fluid (50) in thermal contact with the SMA actuator (210) is performed subsequent to the conveying (320) the process fluid (50) through the heat transfer region (111).

E4. The method (300) of any of paragraphs E1-E3, wherein the conveying (310) the process fluid (50) in thermal contact with the SMA actuator (210) is performed at least partially concurrent with the conveying (320) the process fluid (50) through the heat transfer region (111).

E5. The method (300) of any of paragraphs E1-E4, wherein the SMA actuator (210) includes an SMA torque tube (230), and wherein the transitioning (330) the SMA actuator (210) includes twisting (332) the SMA torque tube (230) about a longitudinal axis (232).

E6. The method (300) of paragraph E5, wherein the twisting (332) includes rotating an actuation element (220) that is coupled to the SMA torque tube (230) about the longitudinal axis (232).

E7. The method (300) of paragraph E6, wherein the twisting (332) includes rotating the actuation element (220) about the longitudinal axis (232) in a first direction (222) responsive to the SMA actuator (210) transitioning from the first conformation toward the second conformation, and wherein the twisting (332) includes rotating the actuation element (220) about the longitudinal axis (232) in a second direction (224) that is opposite the first direction (222) responsive to the SMA actuator (210) transitioning from the second conformation toward the first conformation.

E8. The method (300) of any of paragraphs E1-E7, wherein the SMA actuator (210) includes an SMA lifting tube (250), and wherein the transitioning (330) the SMA actuator (210) includes translating (334) a first end (212) of the SMA lifting tube (250) relative to a second end (214) of the SMA lifting tube (250) at least partially along a lateral direction (226) that is at least substantially perpendicular to at least a portion of the SMA lifting tube (250) between the first end (212) and the second end (214).

E9. The method (300) of any of paragraphs E1-E8, wherein the SMA actuator (210) is the SMA actuator (210) of any of paragraphs A1-A22.

E10. The method (300) of any of paragraphs E1-E9, wherein the thermal management system (100) is the thermal management system (100) of any of paragraphs B1-1390.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

The invention claimed is:

1. A shape memory alloy (SMA) actuator, comprising:
an SMA lifting tube that includes and extends between a first end and a second end and that is configured to be in thermal communication with a process fluid during operative use of the SMA actuator;
wherein the SMA actuator is configured to assume a conformation among a plurality of conformations defined between and including a first conformation and a second conformation; wherein the conformation of the SMA actuator is based, at least in part, on a temperature of the process fluid that is in thermal communication with the SMA lifting tube during operative use of the SMA actuator; wherein the SMA lifting tube is configured such that the second end translates relative to the first end at least partially along a lateral direction that is at least substantially perpendicular to at least a portion of the SMA lifting tube between the first end and the second end as the SMA actuator transitions between the first conformation and the second conformation; wherein one of the first end and the second end is an upstream end of the SMA lifting tube; wherein the other of the first end and the second end is a downstream end of the SMA lifting tube; wherein the SMA actuator is configured such that the process fluid flows through the SMA lifting tube from the upstream end to the downstream end during operative use of the SMA actuator; wherein the SMA lifting tube includes an SMA coil; wherein at least 75% of the SMA coil extends within a coil plane when the SMA actuator is in one of the first conformation and the second conformation; and wherein the lateral direction is at least substantially perpendicular to the coil plane.

2. The SMA actuator of claim 1, wherein the first end and the second end are at least substantially maintained in a fixed rotational orientation relative to one another as the SMA actuator transitions between the first conformation and the second conformation.

3. The SMA actuator of claim 1, wherein the SMA coil deforms along the lateral direction to transition the SMA actuator between the first conformation and the second conformation.

4. The SMA actuator of claim 1, wherein the SMA lifting tube is a hollow SMA lifting tube.

5. The SMA actuator of claim 1, wherein the SMA actuator is at least substantially formed of an SMA material that includes one or more of a binary alloy; a nickel-titanium alloy; a binary nickel-titanium alloy; a ternary alloy; a ternary alloy that includes nickel and titanium; a ternary nickel-titanium-palladium alloy; a ternary manganese-nickel-cobalt alloy; a quaternary alloy; a quaternary alloy that includes nickel and titanium; or an alloy that includes at least one of nickel, titanium, palladium, manganese, hafnium, copper, iron, silver, cobalt, chromium, and vanadium.

6. The SMA actuator of claim 5, wherein the SMA material is configured to transition from a martensite state to an austenite state responsive to the temperature of the SMA material increasing, and wherein the SMA material is configured to transition from the austenite state to the martensite state responsive to the temperature of the SMA material decreasing.

7. The SMA actuator of claim 6, wherein the SMA material is configured to begin a transition from the martensite state to the austenite state when the SMA material reaches an initial heating temperature from below; wherein the SMA material is configured to complete the transition from the martensite state to the austenite state when the SMA material reaches a final heating temperature that is greater than the initial heating temperature; wherein the SMA material is configured to begin a transition from the austenite state to the martensite state when the SMA material reaches an initial cooling temperature from above; and wherein the SMA material is configured to complete the transition from the austenite state to the martensite state when the SMA material reaches a final cooling temperature that is less than the initial cooling temperature.

8. The SMA actuator of claim 6, wherein the SMA actuator is in the first conformation when the SMA material is in one of the martensite state and the austenite state, and wherein the SMA actuator is in the second conformation when the SMA material is in the other of the martensite state and the austenite state.

9. The SMA actuator of claim 6, wherein the SMA actuator is configured to restrict the second end from translating relative to the first end along the lateral direction when the SMA material is in a substantially constant state defined between and including the martensite state and the austenite state.

10. The SMA actuator of claim 5, wherein the SMA actuator is configured to maintain the first end and the second end at a substantially constant separation distance, as measured along a direction parallel to the lateral direction, when the process fluid that flows in thermal communication with the SMA lifting tube maintains the SMA material at a substantially constant temperature during operative use of the SMA actuator.

11. The SMA actuator of claim 1, wherein the SMA lifting tube is configured to perform work on a load as the SMA actuator transitions between the first conformation and the second conformation.

12. The SMA actuator of claim 11, wherein the first end is configured to be operatively coupled to a first component, wherein the second end is configured to be operatively coupled to a second component, and wherein the SMA actuator is configured to translate the first component and the second component relative to one another at least partially along the lateral direction as the SMA actuator transitions between the first conformation and the second conformation.

13. The SMA actuator of claim 12, wherein the SMA actuator is configured to exert a force to push the first component and the second component away from one another.

14. The SMA actuator of claim 12, wherein the SMA actuator is configured to exert a force to pull the first component and the second component toward one another.

15. A shape memory alloy (SMA) actuator, comprising:
an SMA lifting tube that includes and extends between a first end and a second end and that is configured to be in thermal communication with a process fluid during operative use of the SMA actuator;
wherein the SMA actuator is configured to assume a conformation among a plurality of conformations defined between and including a first conformation and a second conformation; wherein the conformation of the SMA actuator is based, at least in part, on a temperature of the process fluid that is in thermal communication with the SMA lifting tube during operative use of the SMA actuator; wherein the SMA lifting tube is configured such that the second end translates relative to the first end at least partially along a lateral direction that is at least substantially perpendicular to at least a portion of the SMA lifting tube between the first end and the second end as the SMA actuator transitions between the first conformation and the second conformation; wherein the SMA lifting tube is configured such that the second end travels relative to the first end at least partially along a transverse direction that is perpendicular to the lateral direction as the SMA actuator transitions between the first conformation and the second conformation; wherein one of the first end and the second end is an upstream end of the SMA lifting tube; wherein the other of the first end and the second end is a downstream end of the SMA lifting tube; and wherein the SMA actuator is configured such that the process fluid flows through the SMA lifting tube from the upstream end to the downstream end during operative use of the SMA actuator.

16. The SMA actuator of claim 15, wherein the first end and the second end are at least substantially maintained in a fixed rotational orientation relative to one another as the SMA actuator transitions between the first conformation and the second conformation.

17. The SMA actuator of claim 15, wherein the SMA lifting tube is a hollow SMA lifting tube.

18. The SMA actuator of claim 15, wherein the SMA actuator is at least substantially formed of an SMA material that includes one or more of a binary alloy; a nickel-titanium alloy; a binary nickel-titanium alloy; a ternary alloy; a ternary alloy that includes nickel and titanium; a ternary nickel-titanium-palladium alloy; a ternary manganese-nickel-cobalt alloy; a quaternary alloy; a quaternary alloy that includes nickel and titanium; or an alloy that includes at least one of nickel, titanium, palladium, manganese, hafnium, copper, iron, silver, cobalt, chromium, and vanadium.

19. The SMA actuator of claim 18, wherein the SMA material is configured to transition from a martensite state to an austenite state responsive to the temperature of the SMA material increasing, and wherein the SMA material is configured to transition from the austenite state to the martensite state responsive to the temperature of the SMA material decreasing.

20. The SMA actuator of claim 15, wherein the SMA lifting tube is configured to perform work on a load as the SMA actuator transitions between the first conformation and the second conformation.

21. The SMA actuator of claim 18, wherein the SMA actuator is configured to maintain the first end and the second end at a substantially constant separation distance, as measured along a direction parallel to the lateral direction, when the process fluid that flows in thermal communication with the SMA lifting tube maintains the SMA material at a substantially constant temperature during operative use of the SMA actuator.

22. The SMA actuator of claim 19, wherein the SMA material is configured to begin a transition from the martensite state to the austenite state when the SMA material reaches an initial heating temperature from below; wherein the SMA material is configured to complete the transition from the martensite state to the austenite state when the SMA material reaches a final heating temperature that is greater than the initial heating temperature; wherein the SMA material is configured to begin a transition from the austenite state to the martensite state when the SMA material reaches an initial cooling temperature from above; and wherein the SMA material is configured to complete the transition from the austenite state to the martensite state when the SMA material reaches a final cooling temperature that is less than the initial cooling temperature.

23. The SMA actuator of claim 19, wherein the SMA actuator is in the first conformation when the SMA material is in one of the martensite state and the austenite state, and wherein the SMA actuator is in the second conformation when the SMA material is in the other of the martensite state and the austenite state.

24. The SMA actuator of claim 19, wherein the SMA actuator is configured to restrict the second end from translating relative to the first end along the lateral direction when the SMA material is in a substantially constant state defined between and including the martensite state and the austenite state.

25. The SMA actuator of claim 20, wherein the first end is configured to be operatively coupled to a first component, wherein the second end is configured to be operatively coupled to a second component, and wherein the SMA actuator is configured to translate the first component and the second component relative to one another at least partially along the lateral direction as the SMA actuator transitions between the first conformation and the second conformation.

26. The SMA actuator of claim 25, wherein the SMA actuator is configured to exert a force to push the first component and the second component away from one another.

27. The SMA actuator of claim 25, wherein the SMA actuator is configured to exert a force to pull the first component and the second component toward one another.

* * * * *